United States Patent
Aoki

(10) Patent No.: US 8,726,090 B2
(45) Date of Patent: May 13, 2014

(54) INFORMATION PROCESSING SYSTEM, MANAGEMENT APPARATUS, INFORMATION PROCESSING APPARATUS, AND COMPUTER PROGRAM PRODUCT

(75) Inventor: Satoshi Aoki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 514 days.

(21) Appl. No.: 13/049,413

(22) Filed: Mar. 16, 2011

(65) Prior Publication Data
US 2011/0231701 A1    Sep. 22, 2011

(30) Foreign Application Priority Data
Mar. 17, 2010  (JP) ................................ 2010-061630

(51) Int. Cl.
G06F 11/00    (2006.01)

(52) U.S. Cl.
USPC .......................................................... 714/38

(58) Field of Classification Search
USPC ..................................................... 714/38.01
See application file for complete search history.

(56) References Cited

U.S. PATENT DOCUMENTS

| | | | |
|---|---|---|---|
| 6,834,347 B2 * | 12/2004 | Goodman et al. | 713/191 |
| 7,246,266 B2 * | 7/2007 | Sneed et al. | 714/27 |
| 7,823,197 B2 * | 10/2010 | Kanamaru et al. | 726/17 |
| 7,903,677 B2 * | 3/2011 | Yasuda et al. | 370/404 |
| 8,108,734 B2 * | 1/2012 | Andrews et al. | 714/47.1 |
| 8,140,552 B2 * | 3/2012 | Tagami et al. | 707/758 |
| 8,140,905 B2 * | 3/2012 | Beaty et al. | 714/35 |
| 8,209,564 B2 * | 6/2012 | Vidal et al. | 714/38.1 |
| 8,423,831 B2 * | 4/2013 | Jesudoss et al. | 714/37 |
| 2004/0181790 A1 * | 9/2004 | Herrick | 717/168 |
| 2007/0101197 A1 * | 5/2007 | Moore et al. | 714/38 |
| 2008/0235517 A1 * | 9/2008 | Ohmori et al. | 713/187 |
| 2009/0323107 A1 * | 12/2009 | Maeda | 358/1.15 |
| 2010/0287363 A1 * | 11/2010 | Thorsen | 713/2 |
| 2011/0225461 A1 * | 9/2011 | Wookey | 714/38.1 |
| 2011/0276835 A1 * | 11/2011 | Lee | 714/38.1 |
| 2012/0226619 A1 * | 9/2012 | Ryoo et al. | 705/304 |
| 2012/0239981 A1 * | 9/2012 | Franke et al. | 714/38.1 |
| 2013/0125107 A1 * | 5/2013 | Bandakka et al. | 717/171 |

FOREIGN PATENT DOCUMENTS

| | | |
|---|---|---|
| JP | 2003-208316 | 7/2003 |
| JP | 2009-87358 | 4/2009 |
| JP | 4481059 | 3/2010 |

* cited by examiner

*Primary Examiner* — Amine Riad
(74) *Attorney, Agent, or Firm* — Oblon, Spivak, McClelland, Maier & Neustadt, L.L.P.

(57) ABSTRACT

A management apparatus is connected to an information processing apparatus via a network, and includes: a determining unit that, when receiving a failure notification that installation of software fails from the information processing apparatus, determines a cause of failure based on the notification; a storing processing unit that, when the determining unit determines that the cause of the failure cannot be solved by remote control, stores registration information in which identifying information of the information processing apparatus and information indicating to-be-installed software which has not been installed on the information processing apparatus are associated with each other, in a storage unit; and a reinstallation instruction unit that, when receiving an inquiry as to whether there is the to-be-installed software from the information processing apparatus, searches the registration information in the storage unit, and instructs the information processing apparatus to install the to-be-installed software thereon if there is the to-be-installed software.

7 Claims, 17 Drawing Sheets

INFORMATION PROCESSING SYSTEM, MANAGEMENT APPARATUS, INFORMATION PROCESSING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2010-061630 filed in Japan on Mar. 17, 2010.

BACKGROUND OF THE INVENTION

1. Field of the Invention

The present invention relates to techniques for installation of software.

2. Description of the Related Art

A conventional known apparatus management system includes: a plurality of image forming apparatuses (information processing apparatuses) connected to an internal network such as a local area network (LAN) in a limited area such as office building, school or home; and a management apparatus that is connected to the image forming apparatuses via an external network such as the Internet and that performs maintenance and management of the image forming apparatuses.

Each image forming apparatus in such an apparatus management system is capable of downloading and installing application software (hereinafter, "software") that expands the functions of the image forming apparatus, from an application management server connected to the image forming apparatus via the external network.

Such an image forming apparatus is configured such that, when installation of software to be purchased fails, a rollback is performed, and after a lapse of a predetermined period of time, reinstallation of the software is performed. The rollback is performed to return the software configuration of the image forming apparatus to a configuration prior to the installation. An example of such an image forming apparatus is disclosed in Japanese Patent Application Laid-open No. 2003-208316.

Therefore, if failure of software installation is caused by a temporary anomalous state of communication environment or the like, reinstallation of the software can be performed when the communication environment returns to a normal state so that the software is successfully installed.

However, with such a conventional image forming apparatus, if an installation failure is caused by physical trouble, such as a breakdown of a central processing unit (CPU) of the image forming apparatus or one of various devices (such as a printer, a scanner, and a facsimile unit, connected to the CPU), or a service call due to paper jam or the like, even when the rollback and the reinstallation are attempted, the installation of software fails.

SUMMARY OF THE INVENTION

It is an object of the present invention to at least partially solve the problems in the conventional technology.

According to one aspect of the present invention, there is provided an information processing system including: an information processing apparatus that allows software to be installed thereon; and a management apparatus that manages installation of the software on the information processing apparatus, the management apparatus being connected to the information processing apparatus via a network, wherein the information processing apparatus includes: an installation unit that installs software when a request for installation of the software has been made; a success-and-failure notifying unit that notifies the management apparatus whether the software has been successfully installed by the installation unit that; and an inquiry unit that transmits an inquiry to the management apparatus as to whether there is to-be-installed software which has not been installed on the information processing apparatus, when the information processing apparatus returns to an installation-acceptable state in which the information processing apparatus accepts software installation, and the management apparatus includes: a determining unit that, when receiving a failure notification that installation of the software fails from the success-and-failure notifying unit, determines a cause of failure based on the failure notification; a storing processing unit that, when the determining unit determines that the cause of the failure cannot be solved by remote control, stores registration information in which identifying information of the information processing apparatus and information indicating to-be-installed software which has not been installed on the information processing apparatus are associated with each other, in a storage unit; and a reinstallation instruction unit that, when receiving the inquiry from the inquiry unit, searches the registration information stored in the storage unit, and instructs the information processing apparatus to install the to-be-installed software thereon.

According to another aspect of the present invention, there is provided a management apparatus that manages installation of software on an information processing apparatus, to which the management apparatus is connected via a network, the management apparatus including: a determining unit that, when receiving a failure notification that installation of the software fails from the information processing apparatus, determines a cause of failure based on the failure notification; a storing processing unit that, when the determining unit determines that the cause of the failure cannot be solved by remote control, stores registration information in which identifying information of the information processing apparatus and information indicating to-be-installed software which has not been installed on the information processing apparatus are associated with each other, in a storage unit; and a reinstallation instruction unit that, when receiving an inquiry as to whether there is the to-be-installed software from the information processing apparatus, searches the registration information stored in the storage unit, and instructs the information processing apparatus to install the to-be-installed software thereon if there is the to-be-installed software.

According to still another aspect of the present invention, there is provided a computer program product including a non-transitory computer-usable medium having computer-readable program codes embodied in the medium for processing information in a management apparatus that includes a determining unit, a storing processing unit, and a reinstallation instruction unit, and that manages installation of software on an information processing apparatus, to which the management apparatus is connected via a network, the program codes when executed causing a computer to execute: determining, when receiving a failure notification that installation of the software fails from the information processing apparatus, a cause of failure based on the failure notification, by the determining unit; storing, when it is determined that the cause of the failure cannot be solved by remote control at the determining, registration information in which identifying information of the information processing apparatus and information indicating to-be-installed software which has not been installed on the information processing apparatus are associated with each other, in a storage unit by the storing processing unit; and searching, when receiving an inquiry as to whether there is the to-be-installed software from the information processing apparatus, the registration information stored in the storage unit, and instructing the information processing apparatus to install the to-be-installed software thereon, by the reinstallation instruction unit, if there is the to-be-installed software.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

System Configuration

Various configurations related to an apparatus management system 1 according to an embodiment of the present invention are described below.

Figure 1:
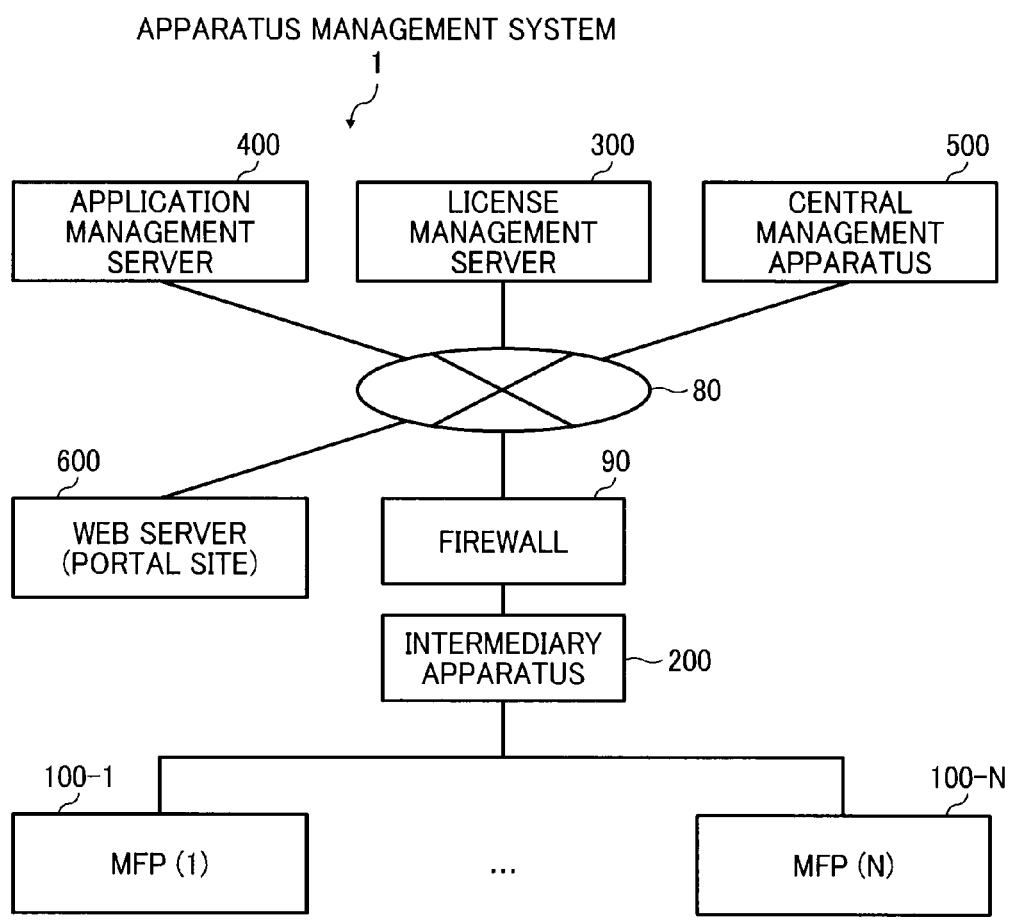
FIG. 1 is a schematic diagram illustrating an outline of a configuration of an apparatus management system according to an embodiment of the present invention.

FIG. 1 is a schematic diagram illustrating an outline of a configuration of the apparatus management system 1 according to the present embodiment.

As illustrated in FIG. 1, the apparatus management system 1 includes an intermediary apparatus 200, a license management server (license management apparatus) 300, an application management server 400, a central management apparatus 500, and a web server 600 that are connected to one another via an external network 80, such as the Internet.

A firewall 90 is provided between the intermediary apparatus 200 and the external network 80. A plurality of multifunction peripherals (MFPs) (image forming apparatuses), or, more specifically, an MFP (1) 100-1, an MFP(2) 100-2, . . . , and an MFP (N) 100-N (N is any integer greater than one) (hereinafter, an unspecified one of the MFPs is referred to as "MFP 100"), are connected to the intermediary apparatus 200 via another network, such as a local area network (LAN), which is different from the external network 80.

The firewall 90 monitors traffic passing across a boundary between the intermediary apparatus 200 and the outside world, and detects and blocks unauthorized electronic access to prevent unauthorized operation performed by a third party that has intruded into the intermediary apparatus 200 via the external network 80, such as the Internet.

The MFP 100 has at least two functions of, for instance, a printer function, a copier function, a facsimile function, and a scanner function. The MFP 100 can install application software (hereinafter, "external application") (see FIG. 3) downloaded from the application management server 400. The MFP 100 is connected to the intermediary apparatus 200 via an internal network such as the LAN so as to allow communication therebetween. The plurality of MFPs 100 (MFPs 100-1, 100-2, . . . , and 100-N) are placed under control of one organization, such as a company, school, or home. The MFP 100 corresponds to an information processing apparatus in the appended claims.

The MFP 100 according to the present embodiment transmits periodical information to the intermediary apparatus 200 when receiving a request for transmitting the periodical information from the intermediary apparatus 200. The periodical information includes supply-state information, jam information, counter information, version information, error information, and apparatus settings, and external application settings including counter information and parameter information related to an external application 118 (see FIG. 3) newly added to the MFP 100.

The intermediary apparatus 200 is an apparatus that intermediates processing performed by and between the MFP 100, and the license management server 300, the application management server 400, the central management apparatus 500, the web server 600, and the like.

The intermediary apparatus 200 according to the present embodiment has functions of transmitting, on a method-by-method basis, a transmission request for the periodical information discussed above at regular time intervals, to the MFP 100, receiving the periodical information transmitted from the MFP 100 in response to the transmission request, and transferring the periodical information to the central management apparatus 500.

The license management server 300 is an apparatus that manages license (authorization) data including a license key of an external application which is to be downloaded from the application management server 400 and to be installed on the MFP 100.

The application management server 400 is an apparatus that manages the external application to be installed on the MFP 100.

The central management apparatus 500 is a server apparatus placed in a service center of a manufacturer or a service provider of the MFP 100. The central management apparatus 500 remotely manages the MFP 100 via the intermediary apparatus 200.

Functions of the central management apparatus 500 include displaying a web user interface (WebUI) that serves as a user interface on a web page. When the central management apparatus 500 is connected to an operation terminal, it is allowed to perform searches using the WebUI, such as collecting information on the MFP 100 as a target of management and checking an error state of the MFP 100.

The web server 600 is a server apparatus that includes a portal site for distribution of software such as an application. More specifically, a user can access the portal site on the web server 600 from a user terminal (not shown), such as a personal computer (PC), or the MFP 100, to purchase a desired external application.

Figure 2:
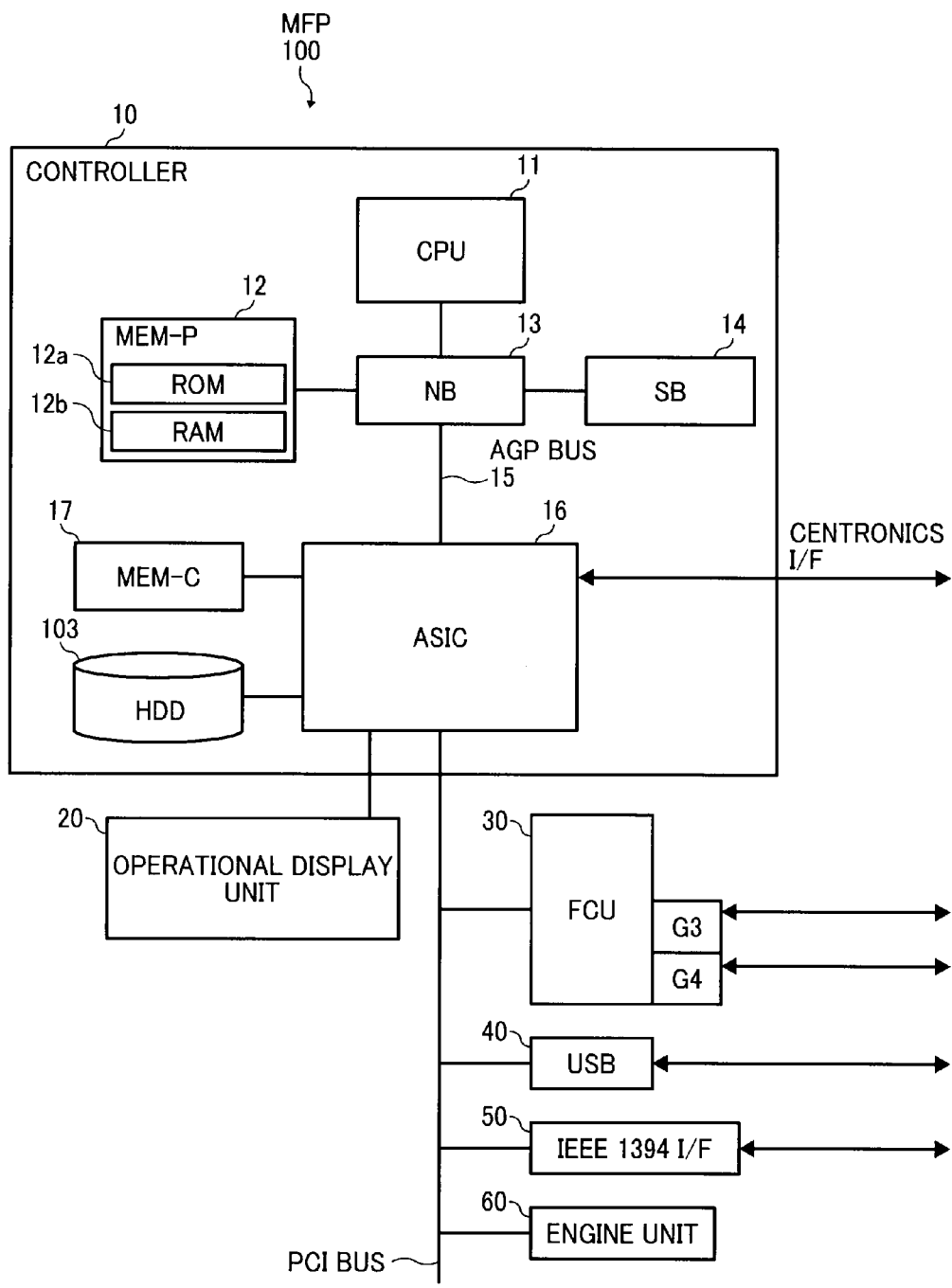
FIG. 2 is a block diagram illustrating a hardware configuration of a multifunction peripheral (MFP)

FIG. 2 is a block diagram illustrating a hardware configuration of the MFP 100.

As illustrated in FIG. 2, the MFP 100 includes a controller 10, an operational display unit 20, and an engine unit 60. The controller 10 and the engine unit 60 are connected via a peripheral component interface (PCI) bus. The controller 10 and the operational display unit 20 are connected via a predetermined data line.

The controller 10 performs overall control of the MFP 100. More specifically, the controller 10 controls drawing, communications, and input to the operational display unit 20 and display on the operational display unit 20. In the present embodiment, the controller 10 includes a CPU 11, a system memory (hereinafter, "MEM-P") 12, a north bridge (NB) 13, a south bridge (SB) 14, an application-specific integrated circuit (ASIC) 16, local memory (hereinafter, "MEM-C") 17, and a hard disk drive (HDD) 103.

The NB 13 and the ASIC 16 are connected via an accelerated graphics port (AGP) bus 15. The MEM-P 12 includes read only memory (ROM) 12a and random access memory (RAM) 12b.

The CPU 11 performs overall control of the MFP 100 and is connected to other units via a chip set which has the MEM-P 12, the NB 13, and the SB 14.

The MEM-P 12 is system memory which is used for storing and loading programs and data thereinto, memory for drawing for the printer, and the like. The ROM 12a is read only memory which is used for storing programs and data. The RAM 12b is writable and readable memory which is used for loading programs and data thereinto, drawing for the printer, and the like.

The NB 13 is a bridge for connecting the CPU 11 to the MEM-P 12, the SB 14, the ASIC 16, and the like. The NB 13 includes a PCI master, an AGP target, and a memory controller that controls reading and writing from and to the MEM-P 12.

The SB 14 is a bridge for connecting the NB 13 to a PCI device, a peripheral device, and the like. The SB 14 is connected to the NB 13 via the PCI bus, to which a network interface (I/F) and the like can also be connected.

The AGP 15 is a bus interface for a graphics accelerator card introduced to speed up graphics operations and allows direct access to the MEM-P 12 with a high throughput, thereby speeding up operations related to the graphic accelerator card.

The ASIC 16 is an integrated circuit (IC) that includes a hardware component for image processing, and functions as a bridge connecting the AGP bus 15, the PCI bus, the HDD 103, and the MEM-C 17 with each other.

The ASIC 16 includes a PCI target, an AGP master, an arbiter (ARB) serving as a main part of the ASIC 16, a memory controller that controls the MEM-C 17, a plurality of direct memory access controllers (DMACs) that rotate image data and the like by hardware logic, and a PCI unit that transfers data between the engine unit 60 and the ASIC 16 via the PCI bus.

A facsimile control unit (FCU) 30, a universal serial bus (USB) 40, and an IEEE 1394 (the Institute of Electrical and Electronics Engineers 1394) interface (I/F) 50 are connected to the ASIC 16 via the PCI bus. The operational display unit 20 is also connected to the ASIC 16 via a data line.

The MEM-C 17 is local memory used as an image buffer for copying, a code buffer, and the like.

The HDD 103 is a storage unit for storing image data, programs, font data, forms, and the like.

The operational display unit 20 includes a push button and a touch panel. On the touch panel, an operation guide and function buttons for utilizing various functions of the MFP 100 are displayed. The touch panel also serves as a user interface for receiving an operation input entered by a user by using the function buttons and/or the like.

Figure 3:
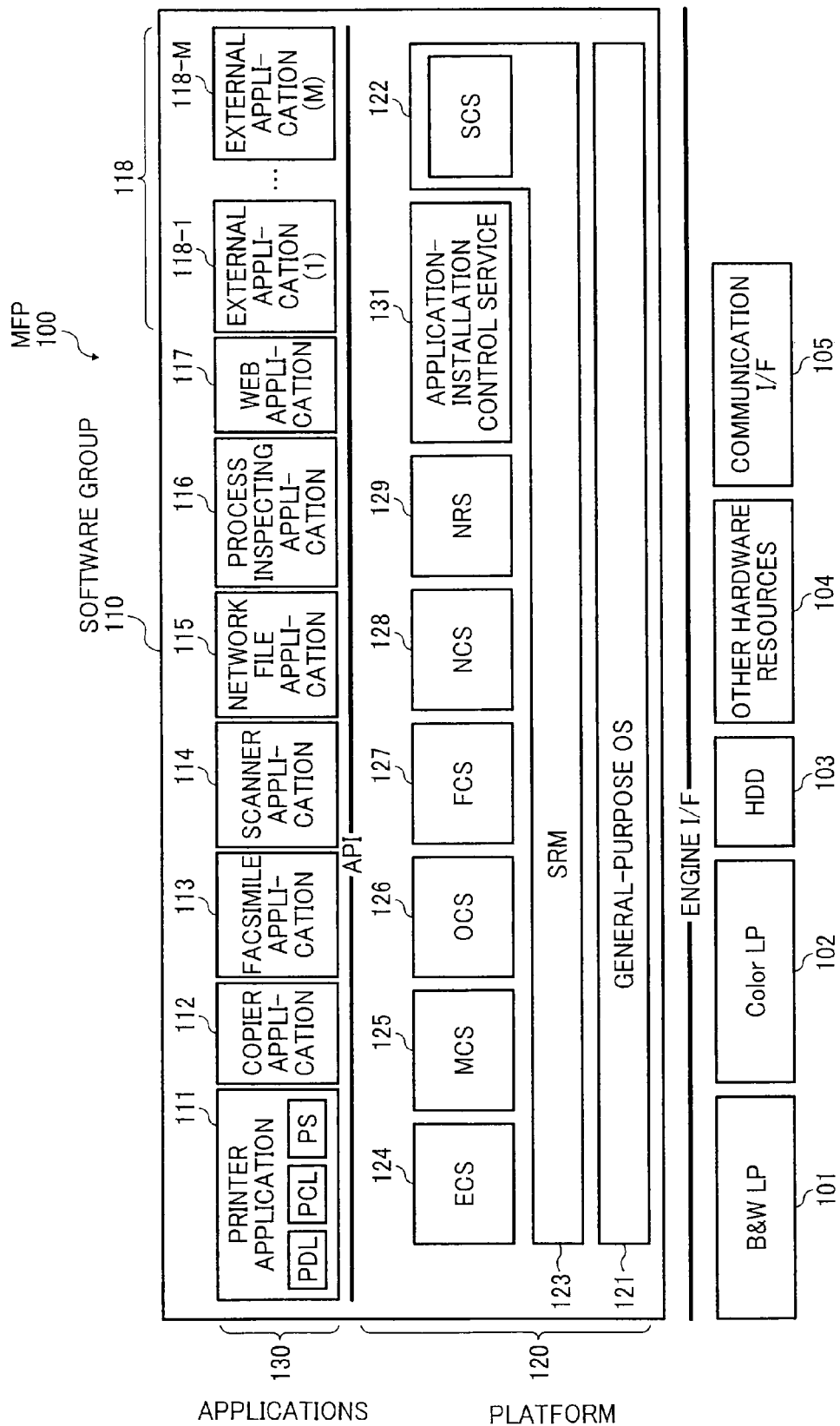
FIG. 3 is a block diagram illustrating a functional configuration of the MFP.

FIG. 3 is a block diagram illustrating a functional configuration of the MFP 100.

As illustrated in FIG. 3, the MFP 100 includes: a software group 110 having a platform 120 and applications 130; and a hardware group as the engine unit 60 discussed above. The hardware group includes a black-and-white laser printer (B&W LP) 101, a color laser printer (color LP) 102, the HDD 103, other hardware resources 104 such as memory and a network I/F, and a communication I/F 105.

The platform 120 includes a general-purpose operating system (OS) 121, various control services (122, 124 to 129, 131, and the like), and a system resource manager (SRM) 123 that manages one or more hardware resources and arbitrates resource requests from the control services. Each control service interprets a processing request from an application and issues a request for obtaining a hardware resource. The platform 120 includes an application program interface (API) that allows receipt of the processing request from the applications 130 by using a predefined function.

The general-purpose OS 121, which is a general-purpose operating system such as UNIX (registered trademark), executes software programs of the platform 120 and the applications 130 concurrently as parallel processes.

The control services include a system control service (SCS) 122, an engine control service (ECS) 124, a memory control service (MCS) 125, an operation-panel control service (OCS) 126, a facsimile control service (FCS) 127, a network control service (NCS) 128, a new remote service (NRS) 129, and an application-installation control service 131.

The SCS 122 performs a process for application management, control of an operating unit, displaying a system menu, indication with light-emitting diodes (LEDs), resource management, control of application interruption, and the like.

The SRM 123 performs a process for system control and resource management in cooperation with the SCS 122. The SRM 123 performs a process for arbitration and execution control according to a request from an upper layer that uses hardware resources, such as memory, an HDD file, a host input/output (I/O) (e.g., a Centronics I/F, the network I/F, an IEEE 1394 I/F, or an RS-232C I/F), or the engine, such as the scanner unit or the printer unit.

More specifically, the SRM 123 determines whether the requested hardware resource is available, or, put another way, whether the requested hardware resource is currently used in response to another request, and if the requested hardware resource is available, sends a notification that the requested hardware resource is available, to the upper layer. The SRM 123 also schedules use of the hardware resources in response to a request from the upper layer, and directly performs the requested operation, such as memory allocation, file creation, or paper feeding and image forming, using a printer engine.

The ECS 124 performs a process for controlling the engine unit 60 that includes the B&W LP 101, the color LP 102, and the other hardware resources 104.

The MCS 125 performs a process for allocation and release of image memory, utilization of the HDD 103, compression and decompression of image data, and the like.

The OCS 126 performs a process for controlling the operational display unit 20 (see FIG. 2) that serves as an interface between an operator (user) and control of the apparatus.

More specifically, when a key is pressed or touched on the operational display unit 20, the OCS 126 recognizes it as a key event. The OCS 126 includes a portion serving as an OCS process that transmits a key event function corresponding to the thus-recognized key to the SCS 122 and a portion serving as an OCS library. Functions that cause various images to be formed and displayed on the operational display unit 20 according to a request from any one of the applications 130 and the control services, other control functions related to control operations of the operational display unit 20, and the like are stored in the OCS library in advance. The OCS library is implemented as being linked with modules of the applications 130 and the control services. The entire OCS 126 can be configured so as to operate as the OCS process. The entire OCS 126 can be configured as the OCS library.

The FCS 127 performs a process for provision of an API that allows facsimile transmission to and reception from each application layer of a system controller by using public switched telephone network (PSTN) or integrated services digital network (ISDN) network, storing and retrieving facsimile data in and from a backup static-RAM (BKM) that manages various facsimile data pieces, scanning for facsimile transmission, printing of received facsimile data, combined transmission and reception, and the like.

The NCS 128 performs a process for providing services common among applications that require network I/O. More specifically, the NCS 128 allocates data pieces received via the network by using various protocols to the applications and intermediates data transmission from the applications to the network.

The NRS 129 is an application that implements features related to via-network remote management, such as data conversion for transmission and reception of data via the network, and a scheduler feature.

The application-installation control service 131 controls processing related to installation of the external application 118 to be used on the MFP 100. More specifically, the application-installation control service 131 performs the installation of the external application 118 and acquires unique license information assigned to the installed external application 118. When receiving the request for transmitting the periodical information from the intermediary apparatus 200, the application-installation control service 131 obtains the periodical information stored in the storage unit, such as the HDD 103 or the RAM 12*b*, of the MFP 100, and transmits the periodical information to the intermediary apparatus 200.

Figure 4:
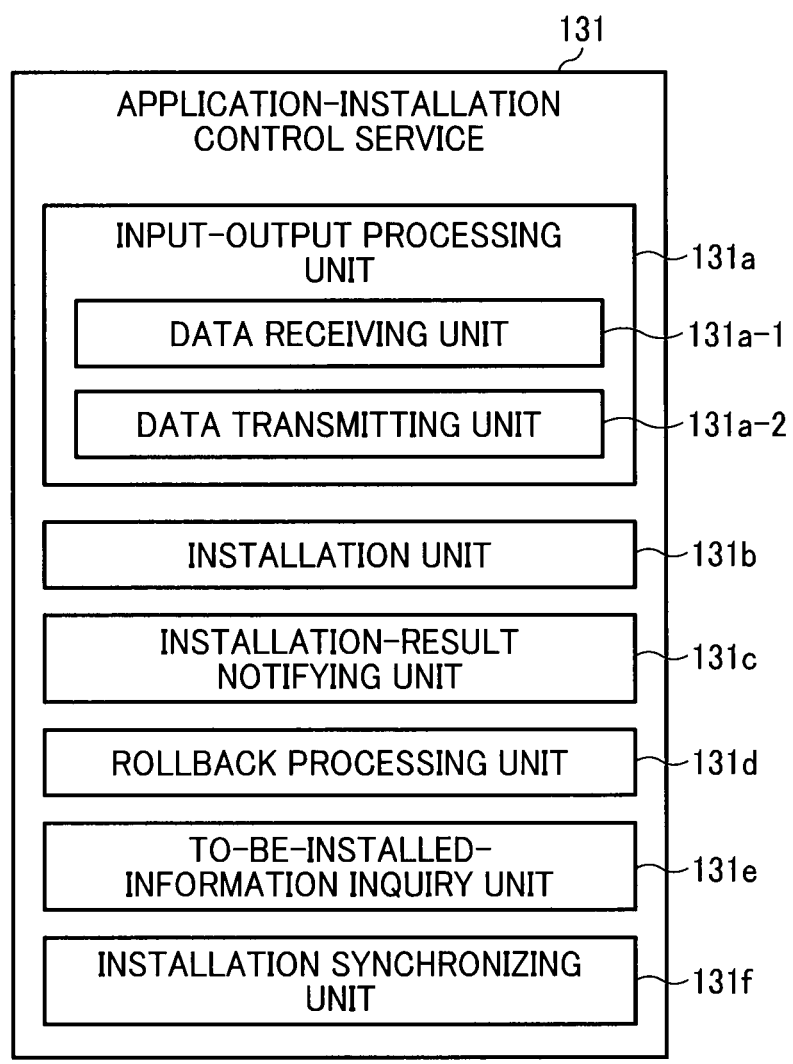
FIG. 4 is a functional block diagram illustrating a detailed configuration of an application-installation control service.

FIG. 4 is a functional block diagram illustrating a detailed configuration of the application-installation control service 131 mentioned above.

As illustrated in FIG. 4, the application-installation control service 131 includes an input-output processing unit 131*a*, an installation unit 131*b*, an installation-result notifying unit 131*c*, a rollback processing unit 131*d*, a to-be-installed-information inquiry unit 131*e*, and an installation synchronizing unit 131*f*.

The input-output processing unit 131*a* that processes signal input and signal output includes a data receiving unit 131*a*-1 and a data transmitting unit 131*a*-2. More specifically, the data receiving unit 131*a*-1 performs processing for receiving various data pieces, such as information on an external application 118 to be installed and a reinstallation instruction signal; and the data transmitting unit 131*a*-2 performs processing for transmitting various data pieces, such as a signal notifying about success or failure in installation and a rollback-completion notification signal.

The installation unit 131*b* controls installation, uninstallation, and reinstallation of the external application 118.

More specifically, the installation unit 131*b* installs an external application to be purchased (hereinafter, referred to as "target external application" in some cases) 118 received from the application management server 400, on the MFP 100; specifies an external application 118 which requires upgrading from among already-installed external applications 118, and upgrades the specified external application 118, in response to a fault-correction instruction signal received from the central management apparatus 500; and re-installs the target external application 118 after the upgrading has been successfully performed.

The installation-result notifying unit 131*c* transmits a notification about success or failure in installation of the target external application 118.

More specifically, when the installation unit 131*b* has successfully performed installation or reinstallation, the installation-result notifying unit 131*c* generates an installation-success notification signal and transmits the signal to the input-output processing unit 131*a*. When receiving the signal, the data transmitting unit 131*a*-2 transfers the installation-success notification signal to the central management apparatus 500.

When the installation unit 131*b* has failed installation or reinstallation, the installation-result notifying unit 131*c* generates an installation-failure notification signal and transmits the signal to the input-output processing unit 131*a*. When receiving the signal, the data transmitting unit 131*a*-2 transfers the installation-failure notification signal to the central management apparatus 500.

The installation-failure notification signal generated by the installation-result notifying unit 131*c* contains failure-cause information indicative of a cause of the failure.

More specifically, the failure-cause information contained in the installation-failure notification signal generated by the installation-result notifying unit 131*c* indicates an ID of the target external application 118, version mismatch between external applications 118 (or more specifically, an external application 118, on which a target external application 118 depends, needs upgrading), or occurrence of a physical failure that cannot be corrected by remote control from the central management apparatus 500. The physical failure may be cause by, for instance, a breakdown of a relevant device, such as the CPU of the MFP 100 or the printer unit connected to the CPU, or a service call due to paper jam or the like.

In the present embodiment, the configuration where the notification about a result of installation is transmitted only to the central management apparatus 500 is employed. Alternatively, another configuration where, for instance, the installation-result notifying unit 131*c* transmits a notification about a result of installation to a plurality of destinations having been designated in advance can be employed.

When the installation unit 131*b* has failed in installation or reinstallation, the rollback processing unit 131*d* performs rollback to return a software configuration of the MFP 100 related to the external application 118 to a configuration prior to the installation or the reinstallation.

The to-be-installed-information inquiry unit 131e queries the central management apparatus 500 whether there is "to-be-installed information" which is information indicating software that has not been installed on the MFP 100, when the MFP 100 has recovered from such a physical failure as mentioned above that is uncorrectable by remote control from the central management apparatus 500, to an installation-acceptable state in which the MFP 100 accepts software installation.

The installation synchronizing unit 131f instructs other MFPs 100 specified as installation-synchronization target in advance, or, put another way, specified as slaves, to install the target external application 118 thereon, and performs a predetermined synchronization process on the other MFPs 100 being the installation-synchronization target. Examples of the predetermined synchronization process include provision of an instruction to perform fault correction and an instruction to perform reinstallation.

The installation synchronizing unit 131f has a synchronization apparatus list (not shown) in itself and performs the processes mentioned above in accordance with settings in the synchronization apparatus list. Accordingly, the installation synchronizing unit 131f performs the synchronization process on only a predetermined external application (software) 118, only according to predetermined timing, and only for the MFP 100 specified as the installation synchronization target in advance.

Note that only an MFP 100 specified as a master (for instance, the MFP (1) 100-1) includes the installation synchronizing unit 131f whereas each of the other MFPs 100 (for instance, the MFP (2) 100-2 to the MFP (N) 100-N) specified as the slaves does not include the installation synchronizing unit 131f.

The units (the input-output processing unit 131a, the installation unit 131b, the installation-result notifying unit 131c, the rollback processing unit 131d, the to-be-installed-information inquiry unit 131e, the installation synchronizing unit 131f, and the like) of the application-installation control service 131 are implemented by the CPU 11 by loading program instructions stored in the ROM 12a, the HDD 103, or the like on the RAM 12b and executing the program instructions.

Referring back to FIG. 3, the applications 130 include a printer application 111 that is an application for a printer with page description language (PDL), printer control language (PCL), and post script (PS), a copier application 112 that is an application for a copier, a facsimile application 113 that is an application for a facsimile, a scanner application 114 that is an application for a scanner, a network file application 115 that is an application for a network file, a process inspecting application 116 that is an application for process inspection, a web application 117 serving as a web server (hypertext transfer protocol (HTTP) server) on a client terminal such as a personal computer (PC) connected to the Internet, and displaying various screens on a web browser that is run on the client terminal, and the external applications 118 externally obtained and installed.

The web application 117 includes various features serving as the web server that controls message exchanges by receiving an HTTP request and transmitting an HTTP response, as a web client that generates and transmits an HTTP request, and as other web-service-providing processing units.

The web server includes HTTP daemon (HTTPd) that performs communication control in accordance with HTTP, an HTTP request processing unit that processes an HTTP request received by the HTTPd, a dispatcher that allocates processes to an appropriate web-service providing unit according to the HTTP request, an extensible markup language (XML) parser that parses an XML document in the body of the XML request for use by every web-service providing unit, an XML serializer that writes an XML document to the body of the HTTP request, a secure sockets layer (SSL) module that is a module for use in encryption for communication, and an HTTP-response generating unit that generates the HTTP response.

The web client includes an HTTP-request generating unit that generates the HTTP request.

Each of processes performed by the applications 130 and the processes performed by the control services provides user service related to image forming operation of a copier, a printer, a scanner, a facsimile, or the like by performing function call and return value transmission in response to the function call and exchanging messages for inter-process communications.

As described above, the MFP 100 according to the present embodiment includes the plurality of applications 130 and the plurality of control services, each of which is run as a process. One or multiple threads are generated in each of the processes so that the processes are performed by multi-threading. The control services provide common services to the applications 130. Accordingly, these large number of processes are performed by multi-tasking and multi-threading while carrying out inter-process communications for cooperation with one another, thereby providing user services, such as the copier, the printer, the scanner, and the facsimile, related to image forming operations.

The MFP 100 is configured such that a third party, such as a customer or a third vendor, of the MFP 100 can develop an external application 118 and install the external application 118 on an application layer, which is an upper layer of a control service layer. FIG. 3 shows that the MFP 100 includes the plurality of external applications 118, or, more specifically, an external application (1) 118-1, an external application (2) 118-2, . . . , and an external application (M) 118-M (M is any integer greater than one) (hereinafter, a not specified one of the external applications is referred to as "external application 118"); alternatively, the MFP 100 may include only one external application.

In the MFP 100 according to the present embodiment, the plurality of processes of the applications 130 and the plurality of processes of the control services are run; another configuration, in which a single process of the applications 130 is run and a single process of the control services in run, can alternatively be employed. Addition or deletion of an application to or from the applications 130 can be performed on an application-by-application-basis. Put another way, as discussed above, an external application 118 can be installed on or uninstalled from the MFP 100.

Figure 5:
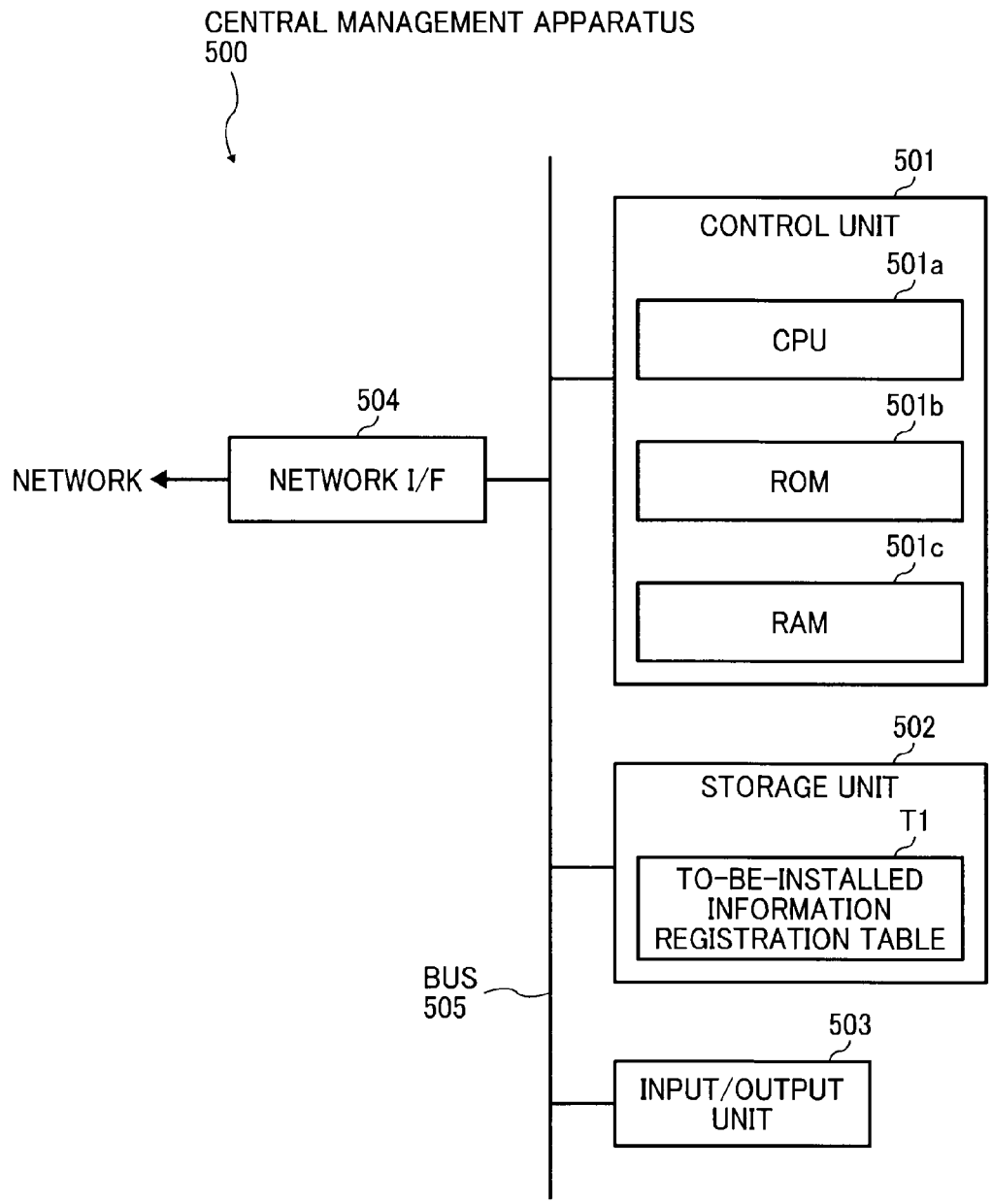
FIG. 5 is a block diagram illustrating a hardware configuration of a central management apparatus.

FIG. 5 is a block diagram illustrating a hardware configuration of the central management apparatus 500.

As illustrated in FIG. 5, the central management apparatus 500 includes, as its major elements, a control unit 501, a storage unit 502, an input/output unit 503, and a network I/F 504. These elements are connected to one another via a bus 505.

The control unit 501 includes a CPU 501a, a ROM 501b, and a RAM 501c. The control unit 501 performs general control of the central management apparatus 500, implements a receiving feature for the periodical information from the MFP 100 and the intermediary apparatus 200, and manages the MFP 100 and the intermediary apparatus 200 according to the thus-received periodical information.

The storage unit 502 is a storage unit, such as an HDD, that stores various information pieces. In the present embodiment, the storage unit 502 stores a to-be-installed information registration table T1 (see FIG. 7), which will be described later, and the like.

The input/output unit 503 is an input interface including a keyboard, a mouse, a display, and the like for receiving inputs entered by an operator.

The network I/F 504 is an interface for communicable connection with the network 80.

Figure 6:
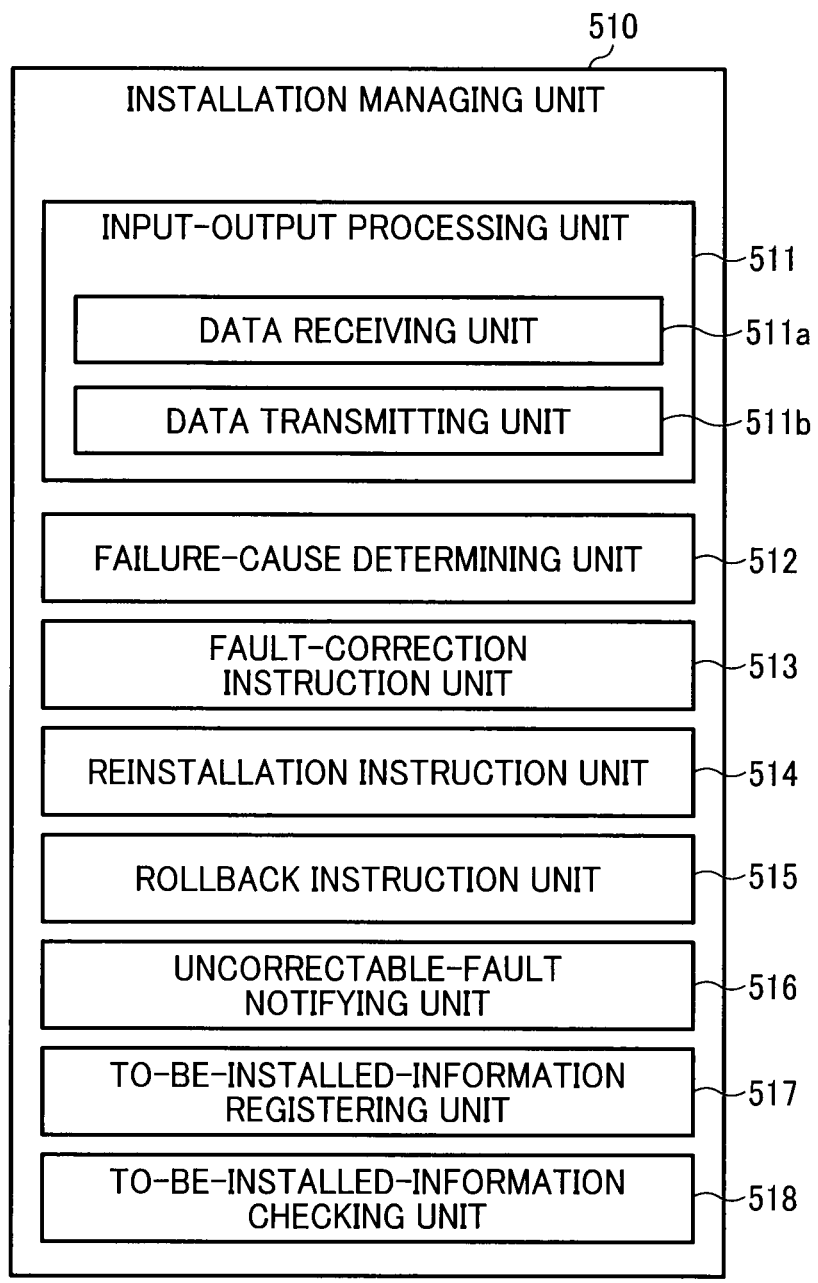
FIG. 6 is a functional block diagram illustrating a functional configuration of the central management apparatus.

FIG. 6 is a functional block diagram illustrating a functional configuration of the central management apparatus 500.

As illustrated in FIG. 6, the central management apparatus 500 includes an installation managing unit 510 that manages installation of the target external application 118 on the MFP 100.

The installation managing unit 510 includes an input-output processing unit 511, a failure-cause determining unit 512, a fault-correction instruction unit 513, a reinstallation instruction unit 514, a rollback instruction unit 515, an uncorrectable-fault notification unit 516, a to-be-installed-information registering unit 517, and a to-be-installed-information checking unit 518.

The input-output processing unit 511 that processes signal input and signal output includes a data receiving unit 511a and a data transmitting unit 511b. More specifically, the data receiving unit 511a receives various data pieces, such as a signal notifying about success or failure in installation from the MFP 100; the data transmitting unit 511b transmits various data pieces, such as a fault-correction instruction signal and a reinstallation instruction signal.

The failure-cause determining unit 512 determines a cause of the failure in installation based on an installation-failure notification signal or a partial-failure notification signal, which is obtained from each MFP 100 via the intermediary apparatus 200.

When, as a result of the determination, it is determined that the cause of the failure can be solved by remote control, or, put another way, the failure is correctable, the failure-cause determining unit 512 transmits an instruction output command to the fault-correction instruction unit 513, whereas when, as the result of the determination, it is determined that the cause of the failure cannot be solved by remote control (or, put another way, the failure is uncorrectable), the failure-cause determining unit 512 transmits, to the to-be-installed-information registering unit 517, destination information (IP address) of the MFP 100, information about the target external application 118, and the like contained in the received installation-failure notification signal or the partial-failure notification signal.

The fault-correction instruction unit 513 generates a fault-correction instruction signal containing fault-correction instruction information, such as an instruction for upgrading of an already-installed external application, based on the instruction output command fed from the failure-cause determining unit 512, and transmits the fault-correction instruction signal to the data transmitting unit 511b.

The reinstallation instruction unit 514 instructs the MFP 100, which has successfully performed a fault-correction process, to perform reinstallation of the target external application 118, and instructs the MFP 100, which has transmitted an inquiry signal for to-be-installed information, to perform reinstallation of the to-be-installed external application 118 that is not installed thereon yet.

The rollback instruction unit 515 instructs an MFP 100 that has failed in reinstallation to perform rollback.

The uncorrectable-fault notification unit 516 generates, when, as a result of the determination made by the failure-cause determining unit 512 as to whether the failure is correctable, it is determined that the cause of the failure cannot be solved by remote control from the central management apparatus 500, or, put another way, the failure is uncorrectable, an uncorrectable-fault notification signal related to the corresponding MFP 100 and transmits the signal to the data transmitting unit 511b.

When, as a result of the determination made by the failure-cause determining unit 512 as to whether the failure is correctable, it is determined that the failure is uncorrectable, the to-be-installed-information registering unit 517 registers registration information in the to-be-installed information registration table T1. The registration information includes destination information (IP address) for identifying the corresponding MFP 100 and information about the to-be-installed external application 118, installation of which has failed and not yet installed on the MFP 100.

Figure 7:
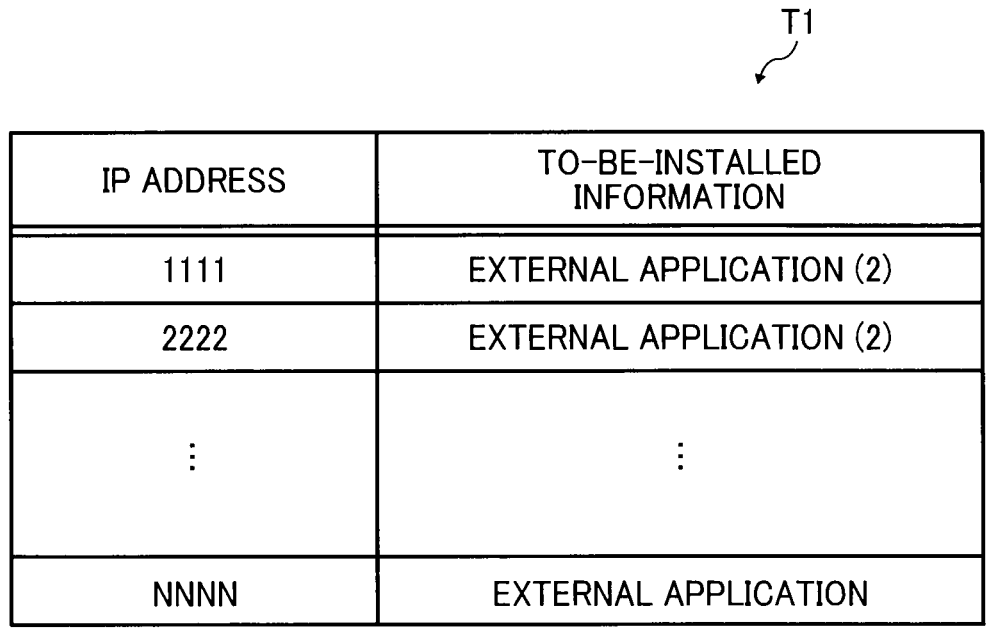
FIG. 7 is a diagram illustrating an example of a configuration of a to-be-installed-information registration table.

FIG. 7 is a diagram illustrating an example of a configuration of the to-be-installed information registration table T1.

As illustrated in FIG. 7, the to-be-installed information registration table T1 contains registration information, in which destination information pieces (IP addresses) for the MFPs 100 are associated with to-be-installed information.

FIG. 7 illustrates an example where address information "1111" for the MFP (1) 100-1 is associated with to-be-installed information "external application (2)". This indicates that the external application (2) is not installed yet on the MFP (1) 100-1, to which address information "1111" is assigned.

Referring back to FIG. 6, when receiving an inquiry signal for to-be-installed information from the MFP 100, the to-be-installed-information checking unit 518 searches the to-be-installed information registration table T1 to determine whether there is any external application 118 that has not been installed on the MFP 100 yet based on address information specified from the inquiry signal and the like.

When, as a result of the search, it is determined that there is an external application 118 as to-be-installed information, the to-be-installed-information checking unit 518 transmits to the data transmitting unit 511b a reinstallation instruction signal that instructs the MFP 100 to reinstall the external application 118 as the to-be-installed information. When receiving this signal, the data transmitting unit 511b transmits the reinstallation instruction signal instructing to reinstall the external application 118 as the to-be-installed information, to the corresponding MFP 100.

The units (the input-output processing unit 511, the failure-cause determining unit 512, the fault-correction instruction unit 513, the reinstallation instruction unit 514, the rollback instruction unit 515, the uncorrectable-fault notification unit 516, the to-be-installed-information registering unit 517, the to-be-installed-information checking unit 518, and the like) of the installation managing unit 510 are implemented by the CPU 501a by loading program instructions stored in the ROM 501b, the storage unit 502, or the like on the RAM 501c and executing the program instructions.

(Processing Operations)

Various processing operations to be performed in the apparatus management system 1 discussed above are described below.

A process flow for a situation where the MFP (1) 100-1 specified as the master does not perform installation synchronization on the MFP (2) 100-2 to the MFP (N) 100-N specified as slaves is described below with reference to sequence diagrams given in FIG. 8 to FIG. 10.

Figure 8:
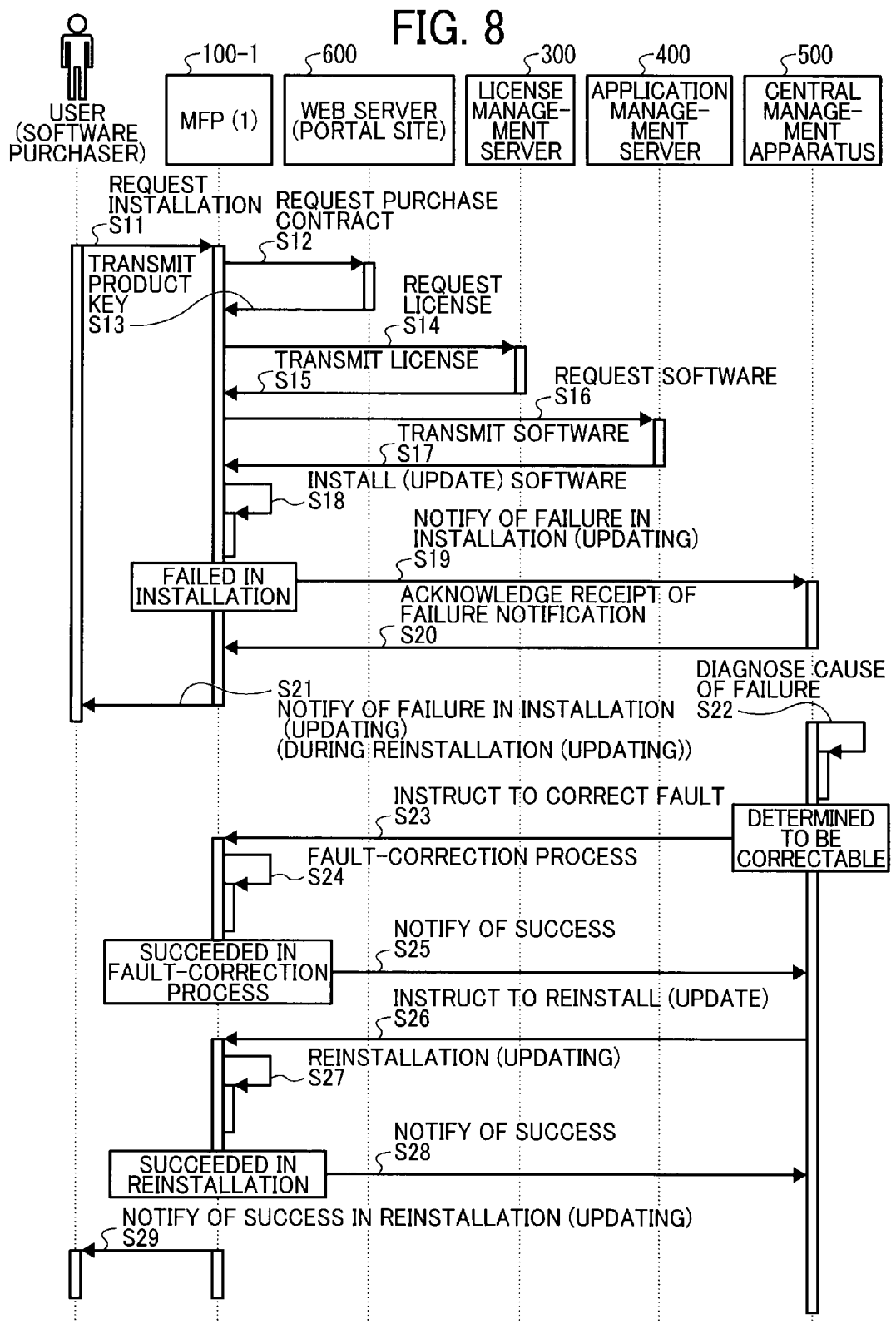
FIG. 8 is a sequence diagram illustrating a process flow in the apparatus management system.

FIG. 8 is a sequence diagram illustrating a process flow, in which the MFP (1) 100-1 fails in installation of an external application (software) 118, performs a predetermined fault-correction process for arranging installation environment according to a fault-correction instruction fed from the central management apparatus 500, and successfully reinstalls the external application 118.

As illustrated in FIG. 8, in this sequence, when the MFP (1) 100-1 receives a request for installation of an external application (software) 118 from a purchaser (hereinafter, simply referred to as "user") of the target external application 118 (Step S11), the MFP (1) 100-1 transmits to the web server 600 (portal site) a purchase-contract requesting signal requesting a purchase contract by utilizing the HTTP-request generating unit (not shown) implemented by the web application 117 (see FIG. 3) or the like (Step S12).

Thereafter, the web server 600 transmits, based on the thus-received purchase-contract requesting signal, a reply signal that contains a product key of the target external application 118, for which purchase contract is desired by the user, to the MFP (1) 100-1 (Step S13).

Subsequently, the MFP (1) 100-1 transmits a license request signal including the product key to the license management server 300 (Step S14).

When receiving the license request signal, the license management server 300 transmits, based on the license request signal, a reply signal that contains license information about the target external application 118 to the MFP (1) 100-1 (Step S15).

Subsequently, the installation unit 131*b* of the MFP (1) 100-1 transmits a software request signal including the license and requesting body portion of the target external application 118 to the application management server 400 (Step S16).

When receiving the software request signal, the application management server 400 transmits the body portion of the target external application 118 corresponding to the product key to the MFP (1) 100-1 (Step S17).

Subsequently, the MFP (1) 100-1 performs installation of the thus-received target external application 118 (Step S18).

In this example sequence, it is assumed that the MFP (1) 100-1 fails in the installation of the target external application 118 performed at Step S18. More specifically, it is assumed that the MFP (1) 100-1 fails in the installation of the target external application 118 because an external application (hereinafter, simply referred to as "installed external application") 118 that has already been installed needs upgrading.

Accordingly, the MFP (1) 100-1 transmits to the central management apparatus 500 the installation-failure notification signal to notify that installation of the target external application 118 has failed (Step S19).

When receiving the installation-failure notification signal, the central management apparatus 500 transmits to the MFP (1) 100-1 a receipt-acknowledgement signal for notification that the central management apparatus 500 has received the signal (Step S20).

When the MFP (1) 100-1 has failed in the installation of the target external application 118 at Step S18, the MFP (1) 100-1 also notifies a user about the installation failure or a status (during reinstallation) by displaying as such on the operational display unit 20 (see FIG. 2) or transmitting a signal to the user terminal (not shown) (Step S21).

After the process performed at Step S20, the central management apparatus 500 diagnoses a cause of the installation failure based on the thus-received installation-failure notification signal and determines whether a cause of the failure can be eliminated by remote control from the central management apparatus 500 (Step S22).

In this example sequence, it is assumed that the central management apparatus 500 recognizes that the MFP (1) 100-1 has failed in the installation of the target external application 118 because of the installed external application 118 that needs upgrading and determines that the cause of the failure can be eliminated by remote control, or, put another way, the failure is correctable.

The central management apparatus 500 transmits a fault-correction instruction signal for correcting fault related to installation environment to the MFP (1) 100-1 (Step S23). In this example, it is assumed the fault-correction instruction signal contains instruction information instructing to perform upgrading of the installed external application 118 that needs upgrading.

When receiving the fault-correction instruction signal, the MFP (1) 100-1 performs a predetermined fault-correction process according to the instruction information contained in the fault-correction instruction signal (Step S24). More specifically, in this example, it is assumed that the MFP (1) 100-1 performs upgrading of the installed external application 118 according to the instruction information.

Thereafter, if the MFP (1) 100-1 has successfully performed the fault-correction process (in this example, upgrading of the installed external application 118), the MFP (1) 100-1 transmits to the central management apparatus 500 a success notification signal for notification of success in the fault-correction process (Step S25).

When receiving the success notification signal, the central management apparatus 500 transmits to the MFP (1) 100-1 a reinstallation instruction signal that instructs the MFP (1) 100-1 to perform reinstallation (Step S26).

Subsequently, when receiving the reinstallation instruction signal, the MFP (1) 100-1 performs reinstallation of the target external application 118 (Step S27).

Thereafter, when the MFP (1) 100-1 has succeeded in the reinstallation, the MFP (1) 100-1 transmits to the central management apparatus 500 a success notification signal for notification that reinstallation has been successfully performed (Step S28). The MFP (1) 100-1 also transmits to a user a notification of the success in the reinstallation by a notification method similar to that used at Step S21 (Step S29).

Figure 9:
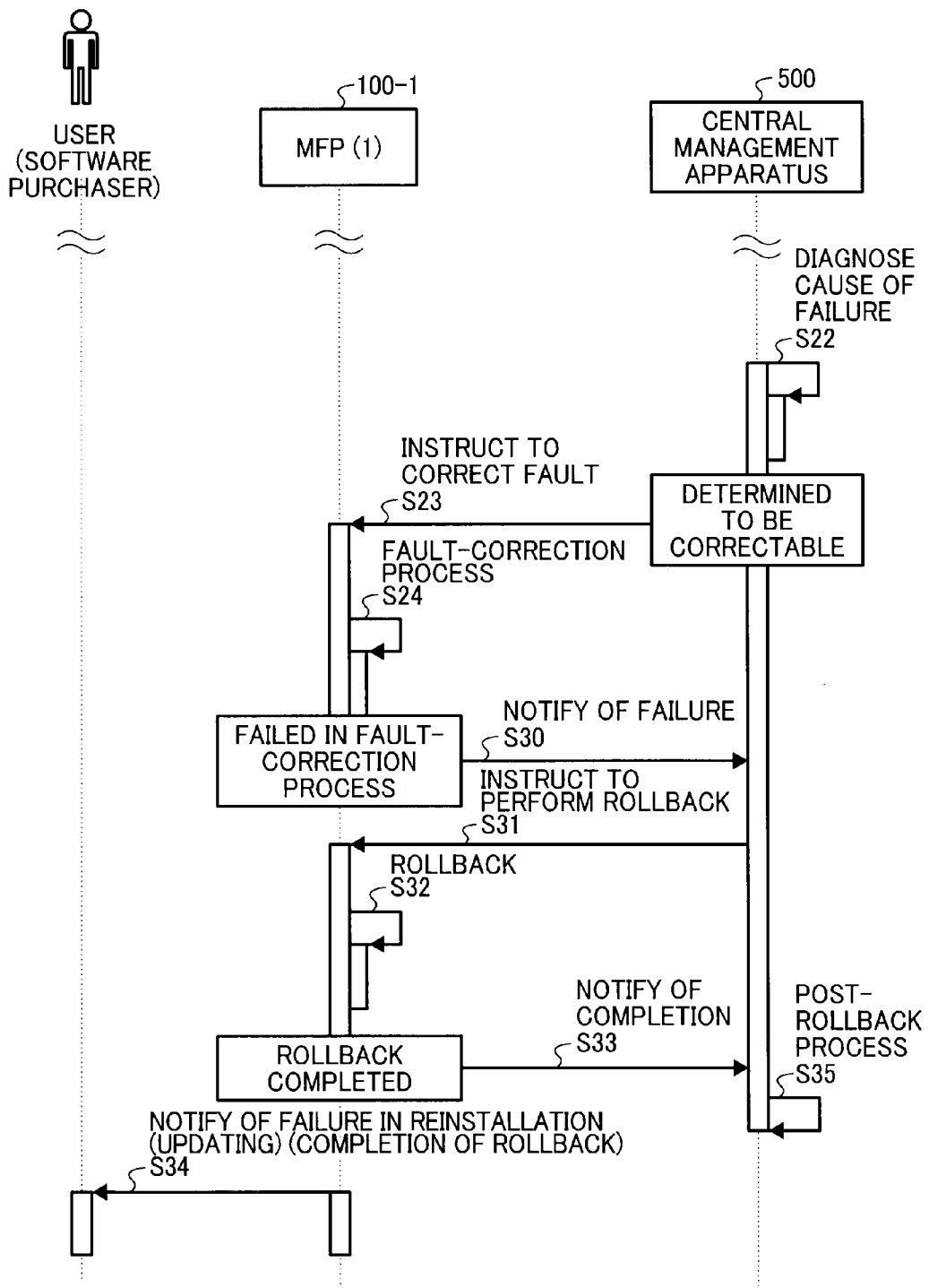
FIG. 9 is a sequence diagram illustrating a process flow in the apparatus management system.

FIG. 9 is a sequence diagram illustrating a process flow, in which the MFP 100 fails in the predetermined fault-correction process for arranging the installation environment performed at Step S24 illustrated in FIG. 8 and performs rollback.

Note that illustration of Step S11 to Step S21 and descriptions about Step S11 to Step S23 are omitted in the sequence illustrated in FIG. 9 for simplification and because processes to be performed from Step S11 to Step S24 are identical to those in the sequence diagram of FIG. 8.

As illustrated in FIG. 9, in this sequence, it is assumed that the MFP (1) 100-1 attempts to perform the predetermined fault-correction process at Step S24 according to the instruction information contained in the received fault-correction instruction signal but fails in the fault-correction process because of various cause. More specifically, for instance, it is assumed that the MFP (1) 100-1 fails in upgrading of the installed external application 118 in spite that the MFP (1) 100-1 is instructed to perform the upgrading.

Subsequently, the MFP (1) 100-1 transmits to the central management apparatus 500 a failure notification signal notifying of failure in the fault-correction process (Step S30).

When receiving the failure notification signal, the central management apparatus 500 transmits to the MFP (1) 100-1 a rollback instruction signal that instructs the MFP (1) 100-1 to perform rollback (Step S31).

Subsequently, when receiving the rollback instruction signal, the MFP (1) 100-1 performs the rollback of the corresponding target external application 118, thereby reversing software configuration of the MFP (1) 100-1 to that prior to the installation of the target external application 118 (Step S32).

On completion of the rollback, the MFP (1) 100-1 transmits to the central management apparatus 500 a completion notification signal notifying that the rollback has completed (Step S33). The MFP (1) 100-1 also transmits to a user a notification of the reinstallation failure and the completion of the rollback by a notification method similar to that used at Step S21 (Step S34).

When receiving the rollback-completion notification signal, the central management apparatus 500 performs a predetermined post-rollback process (Step S35).

Figure 10:
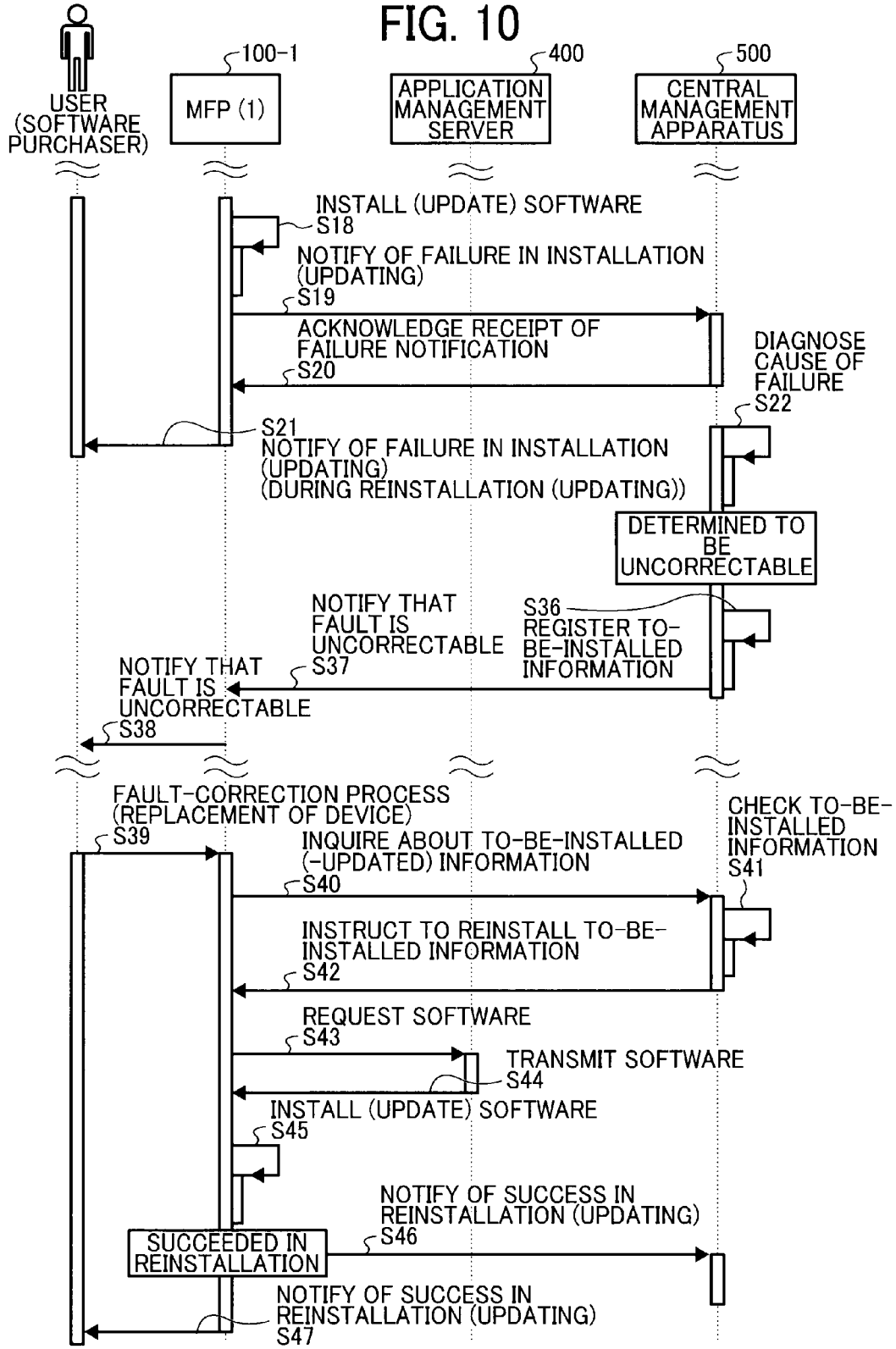
FIG. 10 is a sequence diagram illustrating a process flow in the apparatus management system.

FIG. 10 is a sequence diagram illustrating a process flow, in which in a situation where the MFP 100 (1) 100-1 fails in installation of the external application 118 and the central management apparatus 500 determines that the cause of the failure cannot be eliminated by remote control, the MFP 100 (1) 100-1 performs a predetermined process and succeeds in reinstallation.

Note that illustration of Step S11 to Step S17 and descriptions about Step S11 to Step S21 are omitted in the sequence illustrated in FIG. 10 for simplification and because processes to be performed from Step S11 to Step S22 are identical to those in the sequence diagram of FIG. 8.

As illustrated in FIG. 10, in this sequence, it is assumed that the central management apparatus 500 determines that the cause of the failure cannot be eliminated by remote control, or, put another way, the failure is uncorrectable. In this example sequence, it is assumed that the failure is determined to be uncorrectable because a device in the MFP (1) 100-1 is broken down.

The central management apparatus 500 registers destination information (IP address) of the MFP (1) 100-1 and information about an external application 118 that has not been installed on the MFP (1) 100-1, in the to-be-installed-information registration table T1 (Step S36).

Thereafter, the central management apparatus 500 transmits to the MFP (1) 100-1 an uncorrectable-fault notification signal for notification that the cause of the failure cannot be eliminated by remote control (Step S37). When receiving the signal, the MFP (1) 100-1 transmits to a user a notification that the cause of the failure cannot be eliminated by remote control by a notification method similar to that used at Step S21 (Step S38). The processes to be performed at Step S37 and Step S38 can be omitted.

Thereafter, when the MFP (1) 100-1 has undergone replacement of the broken-down device performed by a user or the like (or, put another way, a fault-correction process for eliminating the cause of the installation failure) and returns to an installation-acceptable state (Step S39), the MFP (1) 100-1 transmits an inquiry signal for inquiring as to whether there is to-be-installed information related to the MFP (1) 100-1, to the central management apparatus 500 (Step S40).

When receiving the signal, the central management apparatus 500 searches the to-be-installed information registration table T1 to determine whether there is the to-be-installed information related to the corresponding MFP (1) 100-1, or, put another way, whether there is a target external application 118 to be installed on the MFP (1) 100-1, based on information in the inquiry signal (Step S41).

When, as a result of this search, it is determined that there is to-be-installed information, or, in other words, a target external application 118 to be installed on the MFP (1) 100-1, the central management apparatus 500 transmits to the MFP (1) 100-1 a reinstallation instruction signal that instructs the MFP (1) 100-1 to reinstall the target external application 118 (Step S42).

When receiving the reinstallation instruction signal, the MFP (1) 100-1 performs a process similar to Step S16 of FIG. 8 mentioned above (Step S43) and performs a process similar to Step S17 mentioned above, thereby receiving body portion of the target external application 118 from the application management server 400 (Step S44).

The MFP (1) 100-1 performs installation of the thus-received target external application 118 (Step S45).

Thereafter, when the MFP (1) 100-1 has successfully performed the reinstallation, the MFP (1) 100-1 transmits to the central management apparatus 500 a success notification signal for notification of success in the reinstallation (Step S46), and also transmits to a user a notification of the success in the reinstallation by a notification method similar to that used at Step S21 (Step S47).

In the embodiment mentioned above, a configuration where the MFP (1) 100-1 re-acquires the target external application 118 has been discussed in consideration of such a situation that a storage unit, such as the HDD 103, is replaced in the device replacement and accordingly the target external application 118 to be installed is removed; however, other configuration can alternatively be employed. For instance, a configuration where the processes to be performed at Step S43 and S44 are skipped in a situation where the MFP (1) 100-1 has the target external application 118 in the HDD 103 or the like even when device replacement is performed can be employed.

A process flow for a situation where the MFP (1) 100-1 specified as the master performs installation synchronization on the MFP (2) 100-2 to the MFP (N) 100-N specified as slaves is described below with reference to sequence diagrams given in FIG. 11 and FIG. 12.

Figure 11:
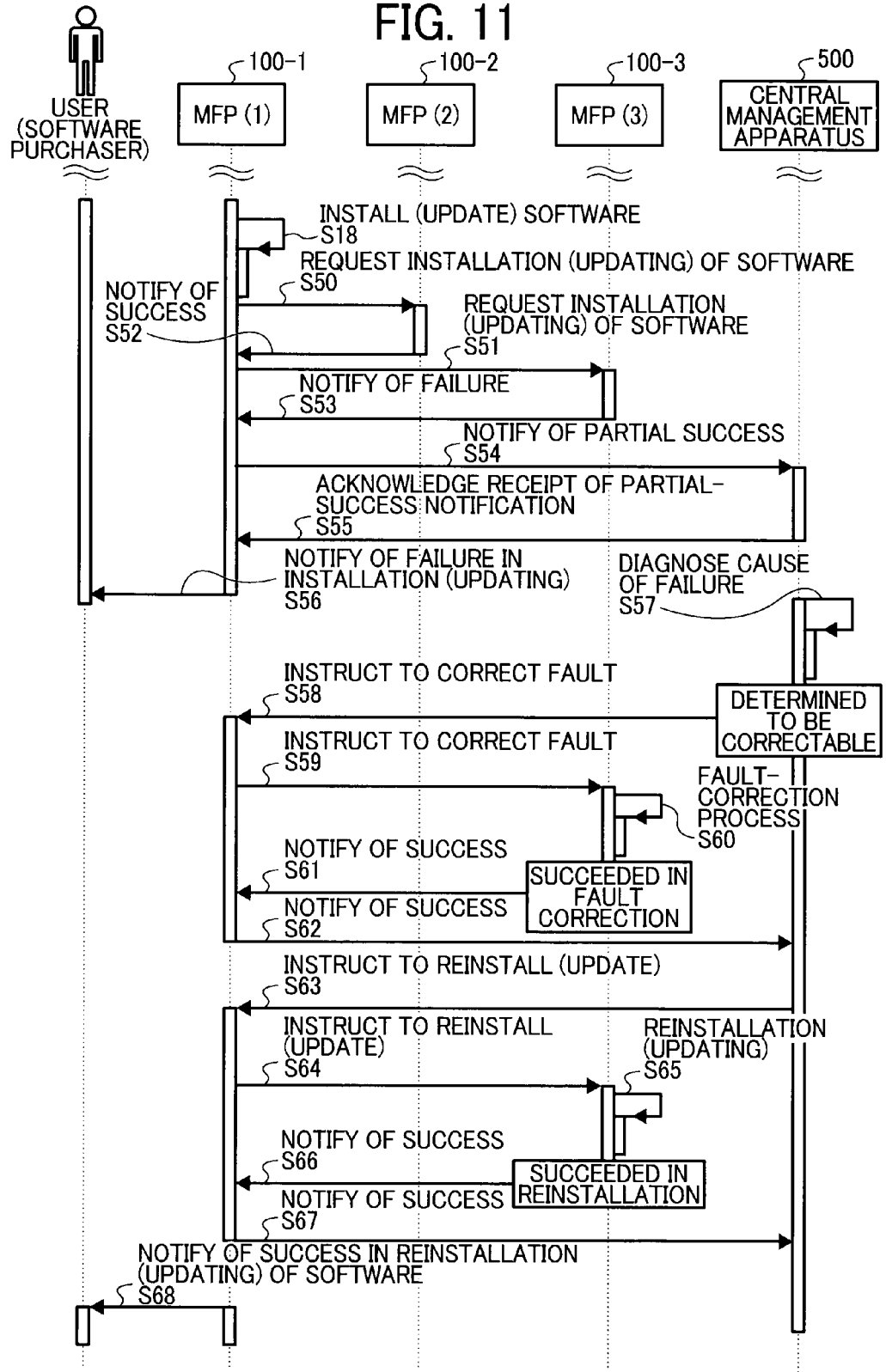
FIG. 11 is a sequence diagram illustrating a process flow in the apparatus management system.

FIG. 11 is a sequence diagram illustrating a process flow, in which during installation synchronization performed by the MFP (1) 100-1, the MFP (3) 100-3 specified as the slave fails in installation of an external application 118, performs a predetermined fault-correction process for arranging installation environment according to a fault-correction instruction fed from the MFP (1) 100-1, and successfully reinstalls the external application 118.

Note that illustration of Step S11 to Step S17 is omitted in the sequence illustrated in FIG. 11 for simplification and because processes to be performed from Step S11 to Step S18 are identical to those in the sequence diagram of FIG. 8.

As illustrated in FIG. 11, in this sequence, it is assumed that, after the process performed at Step S18, the MFP (1) 100-1 transmits an installation request signal requesting installation of the target external application 118 to the MFP (2) 100-2 specified as the slave (Step S50) and to the MFP (3) 100-3 specified as the slave (Step S51).

In this example sequence, it is assumed that the MFP (2) 100-2 successfully installs the target external application 118 and transmits to the MFP (1) 100-1 a success notification signal for notification of success in the installation (Step S52). In contrast, the MFP (3) 100-3 fails in the installation of the target external application 118 and transmits to the MFP (1) 100-1 a failure notification signal for notification of failure in the installation (Step S53).

Subsequently, the MFP (1) 100-1 transmits to the central management apparatus 500 a partial-failure notification signal (or partial-success notification signal) to notify that installation of the target external application 118 on some of the MFPs 100 specified as the slaves has failed (Step S54).

When receiving the partial-failure notification signal, the central management apparatus 500 transmits to the MFP (1) 100-1 a receipt acknowledgement signal for notification of receipt of the signal (Step S55).

After the process performed at Step S54, the MFP (1) 100-1 also transmits to a user a notification of partial failure in the installation or a status (during reinstallation) by a notification method similar to that used at Step S21 (Step S56).

After the process performed at Step S55, the central management apparatus 500 diagnoses a cause of the failure in a manner similar to that performed at Step S22 of FIG. 8 mentioned above (Step S57).

In this example sequence, it is assumed that the central management apparatus 500 recognizes that the MFP (3) 100-3 has failed in the installation of the target external application 118 because of the installed external application 118 that needs upgrading and determines that the cause of the failure can be eliminated by remote control, or, put another way, the failure is correctable.

The central management apparatus 500 performs an operation similar to that performed at Step S23 of FIG. 8 mentioned above, or, more specifically, transmits a fault-correction instruction signal for correcting fault related to installation environment to the MFP (1) 100-1 (Step S58). In this example, it is assumed the fault-correction instruction signal contains instruction information instructing to perform upgrading of an installed external application 118 that needs upgrading.

When receiving the fault-correction instruction signal, the MFP (1) 100-1 transfers the fault-correction instruction signal to the MFP (3) 100-3 (Step S59).

When receiving the fault-correction instruction signal, the MFP (3) 100-3 performs a predetermined fault-correction process according to the instruction information contained in the fault-correction instruction signal (Step S60). More specifically, in this example, it is assumed that the MFP (3) 100-3 performs upgrading of the installed external application 118 according to the instruction information.

Thereafter, if the MFP (3) 100-3 has successfully performed the fault-correction process (in this example, upgrading of the installed external application 118), the MFP (3) 100-3 transmits to the MFP (1) 100-1 a success notification signal for notification of success in the fault-correction process (Step S61).

When receiving the success notification signal, the MFP (1) 100-1 transfers the success notification signal to the central management apparatus 500 (Step S62).

When receiving the success notification signal, the central management apparatus 500 transmits to the MFP (1) 100-1 a reinstallation instruction signal that instructs the MFP (1) 100-1 to perform reinstallation of the target external application 118 (Step S63). If a failure notification signal is transmitted in response to the fault-correction instruction, the central management apparatus 500 transmits a rollback instruction signal rather than a reinstallation instruction signal to the MFP (1) 100-1.

When receiving the reinstallation instruction signal, the MFP (1) 100-1 transfers the reinstallation instruction signal to the MFP (3) 100-3 (Step S64).

When receiving the reinstallation instruction signal, the MFP (3) 100-3 performs reinstallation (Step S65). On succeeding in the reinstallation, the MFP (3) 100-3 transmits to the MFP (1) 100-1 a success notification signal for notification of success in the reinstallation (Step S66).

When receiving the success notification signal, the MFP (1) 100-1 transfers the success notification signal to the central management apparatus 500 (Step S67), and also transmits to a user a notification that the target external application 118 has been successfully installed on all the MFPs 100 by a notification method similar to that used at Step S21 (Step S68).

In the present embodiment, a configuration where, at Step S56, a partial-failure notification is issued even when only one of the MFPs 100 specified as the slaves has failed in the installation of the target external application 118. Alternatively, a configuration where a retry count is set to the central management apparatus 500 in advance and the failure notification is transmitted, rather than for one installation failure, but only when installation remains failure even when the number of installation attempts has reached the retry count can be employed.

Figure 12:
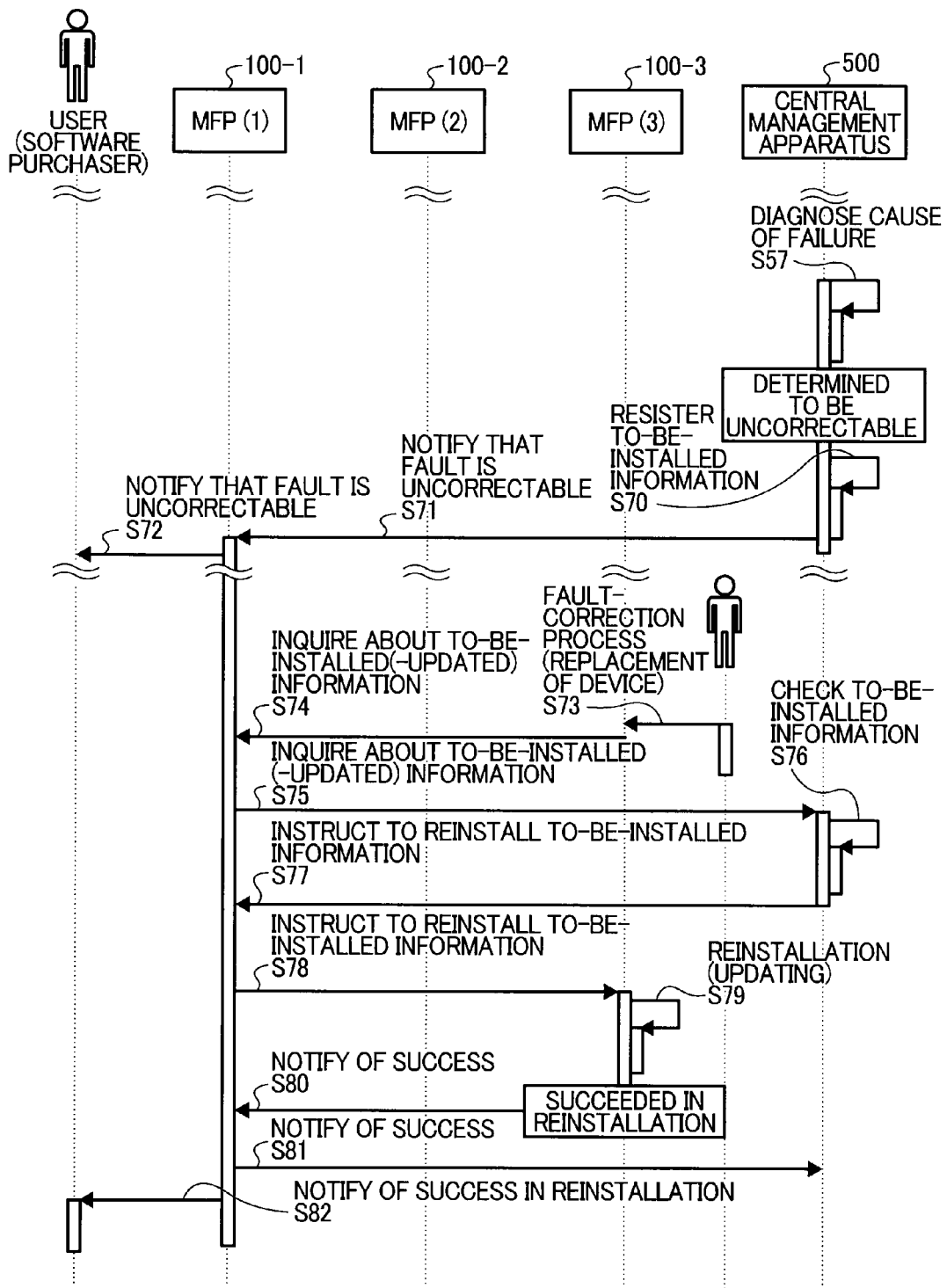
FIG. 12 is a sequence diagram illustrating a process flow in the apparatus management system.

FIG. 12 is a sequence diagram illustrating a process flow for a situation where the central management apparatus 500 has determined that the failure is uncorrectable in the diagnosis process of the cause of the failure performed at Step S57 of FIG. 11.

Note that illustration of Step S11 to Step S18 and Step S50 to Step S56 and descriptions about Step S11 to Step S18 and Step S50 to Step S56 are omitted in the sequence illustrated in FIG. 12 for simplification and because processes to be performed from Step S50 to Step S56 are identical to those in the sequence diagram of FIG. 11.

As illustrated in FIG. 12, in this sequence, it is determined that the failure is uncorrectable in the diagnosis process of the cause of the failure performed at Step S57; subsequently, the central management apparatus 500 performs a process similar to that performed at Step S36 of FIG. 10 mentioned above to register information about an external application 118 that has not been installed on the MFP (3) 100-3 yet, in the to-be-installed information registration table T1 (Step S70).

Thereafter, the central management apparatus 500 transmits an uncorrectable-fault notification signal to the MFP (1) 100-1 (Step S71).

Subsequently, the MFP (1) 100-1 performs a process similar to that performed at Step S38 of FIG. 10 mentioned above, thereby notifying a user that the cause of the failure cannot be eliminated by remote control (Step S72). The processes to be performed at Step S71 and Step S72 can be omitted.

Thereafter, at Step S73, when the MFP (3) 100-3 undergoes replacement of the broken-down device performed by a user or the like (or, in other words, a fault-correction process for eliminating the cause of the installation failure) and returns to an installation-acceptable state, the MFP (3) 100-3 transmits an inquiry signal for inquiring as to whether there is to-be-installed information related to the MFP (3) 100-3, to the MFP (1) 100-1 (Step S74).

When receiving the inquiry signal, the MFP (1) 100-1 transfers the inquiry signal to the central management apparatus 500 (Step S75).

When receiving the inquiry signal, the central management apparatus 500 searches the to-be-installed information registration table T1 to determine whether there is the to-be-installed information related to the MFP (3) 100-3, or, put another way, there is a target external application 118 to be installed on the MFP (3) 100-3, based on information in the inquiry signal (Step S76).

When, as a result of this search, it is determined that there is to-be-installed information, or, put another way, there is a target external application 118 to be installed on the MFP (3) 100-3, the central management apparatus 500 transmits to the MFP (1) 100-1 a reinstallation instruction signal instructing reinstallation of the target external application 118 (Step S77).

When receiving the reinstallation instruction signal, the MFP (1) 100-1 transfers the reinstallation instruction signal to the MFP (3) 100-3 (Step S78).

When receiving the reinstallation instruction signal, the MFP (3) 100-3 performs reinstallation of the target external application 118 (Step S79). If the MFP (3) 100-3 succeeds in the reinstallation, the MFP (3) 100-3 transmits to the MFP (1) 100-1 a success notification signal of success in the reinstallation (Step S80).

When receiving the success notification signal, the MFP (1) 100-1 transfers the success notification signal to the central management apparatus 500 (Step S81), and also transmits to a user a notification of the success in the reinstallation by a notification method similar to that used at Step S21 (Step S82).

The process flows for the MFP 100 specified as the master in the sequence diagrams illustrated in FIG. 8 to FIG. 12 are described in detail below with reference to the flowcharts given in FIG. 13 to FIG. 15.

Figure 13:
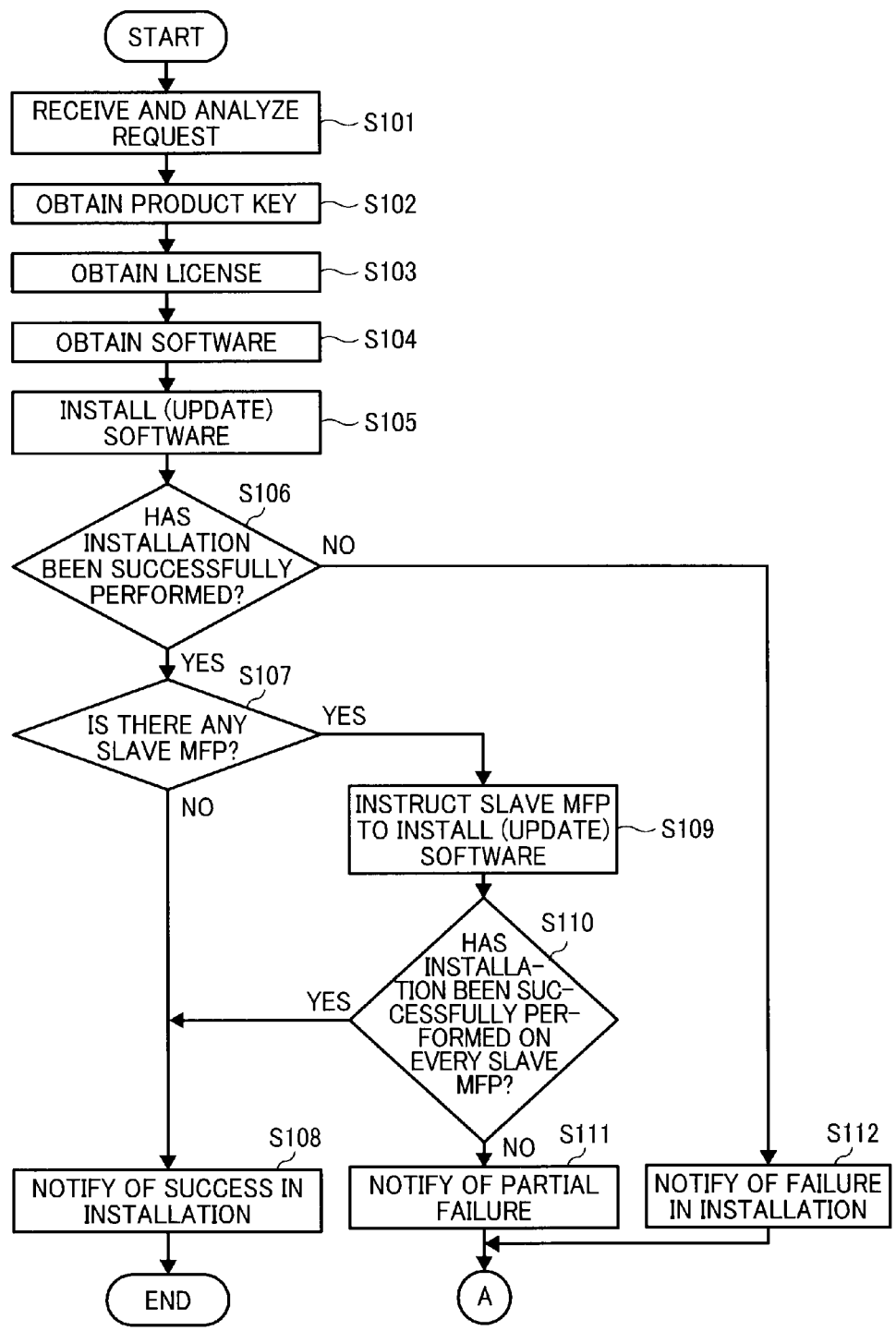
FIG. 13 is a flowchart illustrating a process flow in the MFP.
Figure 14:
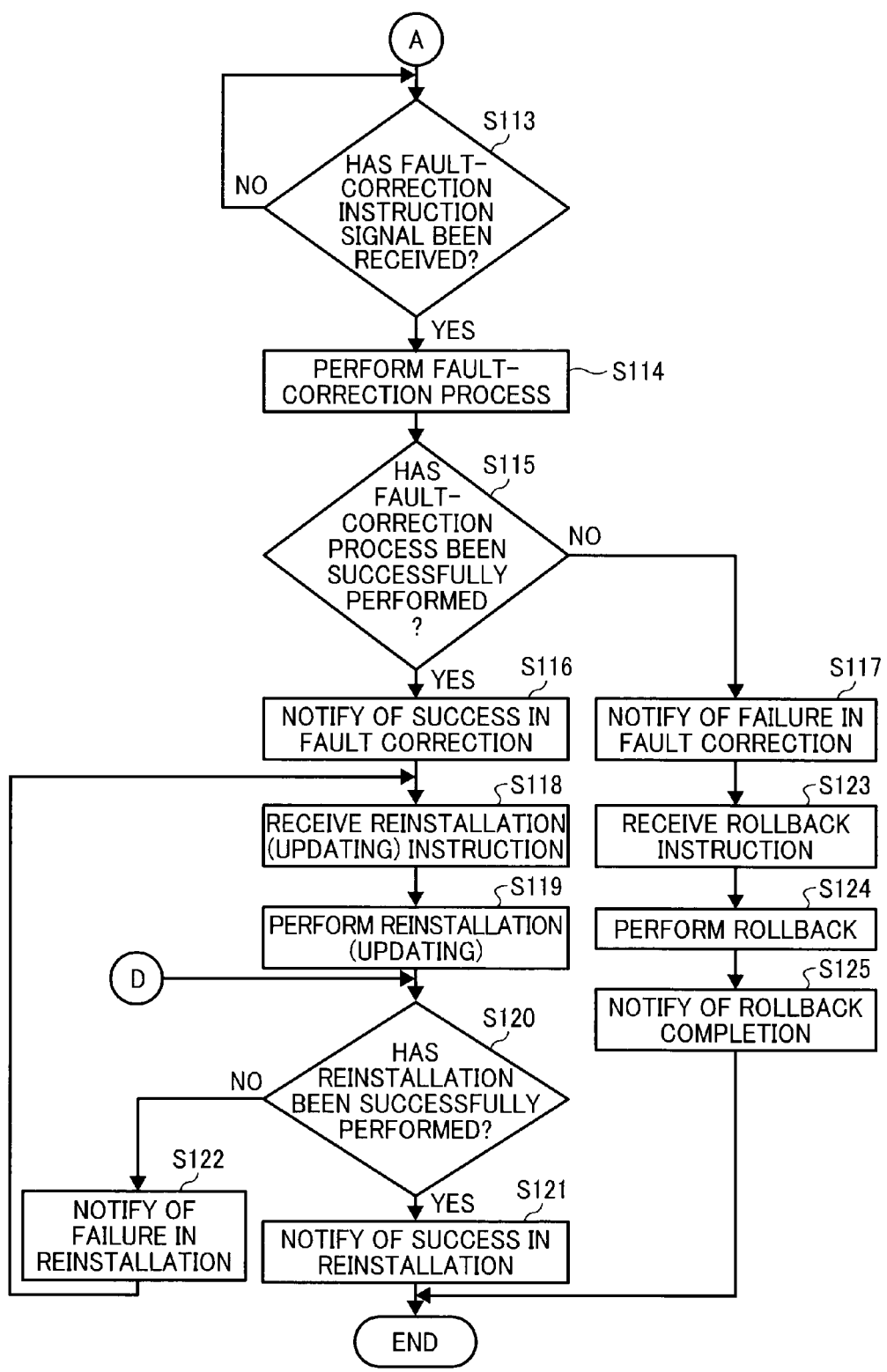
FIG. 14 is a flowchart illustrating a process flow in the MFP.
Figure 15:
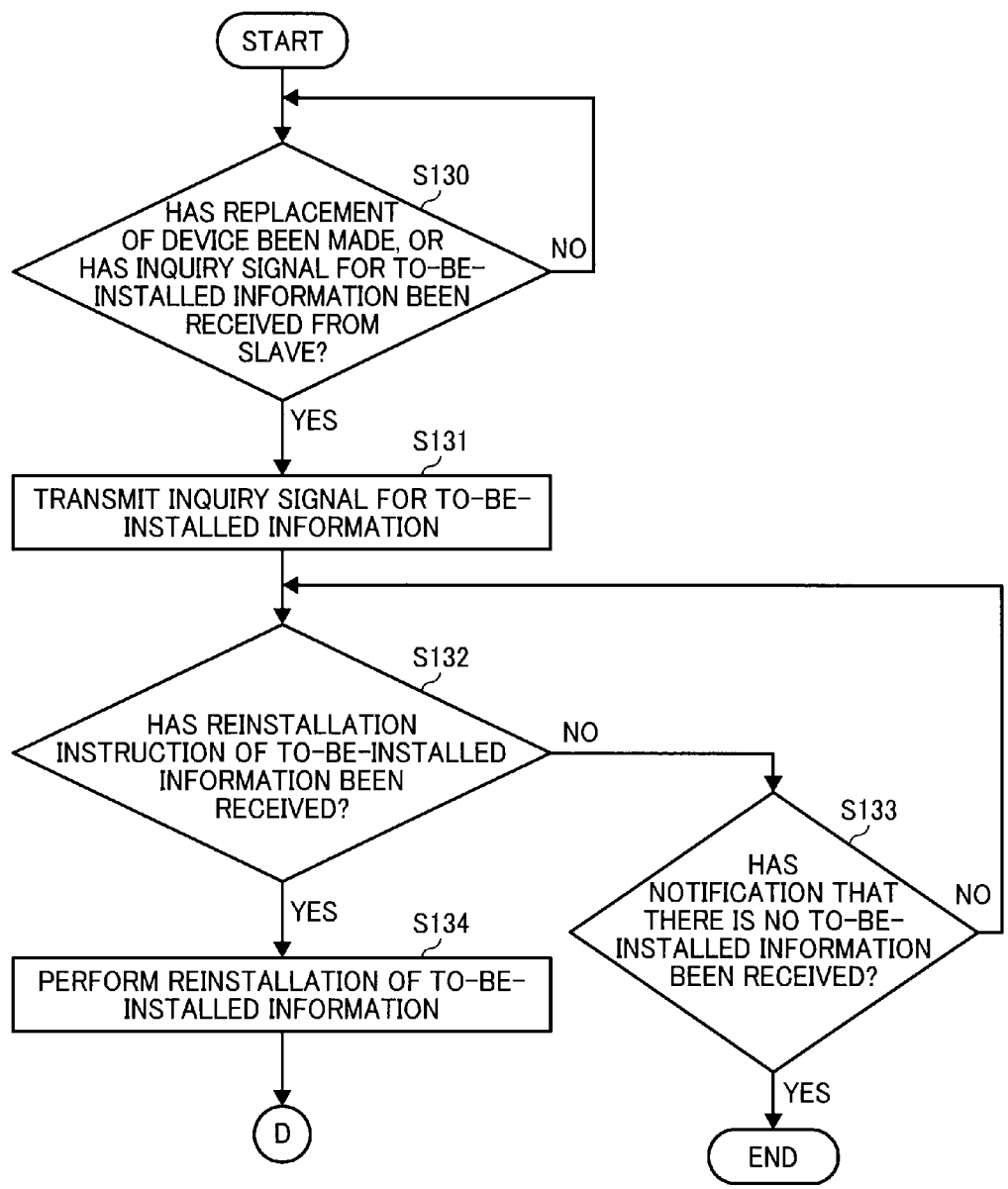
FIG. 15 is a flowchart illustrating a process flow in the MFP.

FIG. 13 to FIG. 15 are flowcharts illustrating a procedure of processes to be performed by the application-installation control service 131 of the MFP 100 specified as the master.

As illustrated in FIG. 13, when an installation request for installation of the target external application 118 on the MFP (1) 100-1 is made by a user using the user terminal (not shown) or the operational display unit 20, the application-installation control service 131 of the MFP (1) 100-1 specified as the master receives the installation request via the data receiving unit 131a-1.

Thereafter, the application-installation control service 131 analyzes the request from the user and transmits a purchase-contract requesting signal requesting a purchase contract to the web server (portal site) 600 via the data transmitting unit 131a-2 by utilizing the HTTP-request generating unit (not shown) implemented by the web application 117 (see FIG. 3) or the like (Step S101).

The application-installation control service 131 thus receives a reply signal containing a product key transmitted from the web server 600 via the data receiving unit 131a-1 (Step S102).

Subsequently, the application-installation control service 131 transmits a license request signal including the product key to the license management server 300 via the data transmitting unit 131a-2. The application-installation control service 131 thus receives a reply signal containing license information of the target external application 118 from the license management server 300 via the data receiving unit 131a-1 (Step S103).

Subsequently, the installation unit 131b of the application-installation control service 131 transmits a software request signal including the license and requesting body portion of the target external application 118 via the data transmitting unit 131a-2. The installation unit 131b of the application-installation control service 131 thus receives the body portion of the target external application 118 via the data receiving unit 131a-1 (Step S104).

Subsequently, the installation unit 131b performs installation of the thus-received target external application 118 (Step S105).

Thereafter, the installation-result notifying unit 131c determines whether the installation unit 131b has successfully performed the installation (Step S106).

If, as a result of the determination, it is determined that the installation has been successfully performed (YES at Step S106), the installation synchronizing unit 131f determines whether there is any MFP (hereinafter, simply referred to as "slave MFP") 100 that is a slave to be subjected to installation synchronization at this point in time (Step S107).

If, as a result of this determination, it is determined that there is no slave MFP 100 (NO at Step S107), the installation-result notifying unit 131c transmits an installation-success notification signal to the data transmitting unit 131a-2 (Step S108). When receiving the installation-success notification signal, the data transmitting unit 131a-2 transmits the installation-success notification signal to the central management apparatus 500. Then, this process flow ends.

Note that, at Step S108, a process of notifying a user of the installation success by displaying as such on the operational display unit 20 (see FIG. 2) or transmitting a signal to the user terminal (not shown) is also performed under control of the installation-result notifying unit 131c.

In contrast, if, as a result of the determination made at Step S106, it is determined that the installation has failed (NO at Step S106), the installation-result notifying unit 131c transmits the installation-failure notification signal to the data transmitting unit 131a-2 (Step S112). When receiving the installation-failure notification signal, the data transmitting unit 131a-2 transmits the installation-failure notification signal to the central management apparatus 500.

Note that, at Step S112, a process of notifying a user of the installation failure by displaying as such on the operational display unit 20 (see FIG. 2) or transmitting a signal to the user terminal (not shown) is also performed under control of the installation-result notifying unit 131c.

If, as a result of the determination made at Step S107, it is determined that there is at least one slave MFP 100 (YES at Step S107), the installation synchronizing unit 131f instructs the MFP 100 (e.g., the MFP (3) 100-3) corresponding to installation-synchronization target to install the target external application 118 (Step S109).

Thereafter, receipt of a signal notifying whether installation has been successfully performed from every slave MFP 100 is monitored (Step S110). If, through this monitoring, it is determined that an installation-success notification signal has been received from the every slave MFP 100 (YES at Step S110), this process flow proceeds to Step S108 mentioned above.

In contrast, if, through the monitoring performed at Step S110, it is determined that an installation-failure notification signal has been received from at least one slave MFP 100 (NO at Step S110), the installation-result notifying unit 131c transmits a partial-failure notification signal to the data transmitting unit 131a-2 (Step S111). When receiving the partial-failure notification signal, the data transmitting unit 131a-2 transmits the partial-failure notification signal to the central management apparatus 500.

Note that, at Step S111, a process of notifying a user of the failure in installation on some of the slave MFPs 100 is also performed by displaying as such on the operational display unit 20 (see FIG. 2) or transmitting a signal to the user terminal (not shown) under control of the installation-result notifying unit 131c.

After the processes performed at Step S111 and Step S112, the application-installation control service 131 monitors receipt of a fault-correction instruction signal (or a signal notifying that the fault is uncorrectable) from the central management apparatus 500 via the data receiving unit 131a-1 (Step S113).

If, through the monitoring, it is determined that a fault-correction instruction signal has been received (YES at Step S113), the application-installation control service 131 performs a predetermined fault-correction process according to instruction information contained in the received fault-correction instruction signal (Step S114). Examples of the predetermined fault-correction process include upgrading, which is performed by the installation unit 131b, of an installed external application 118 corresponding to itself (i.e., installed on the master MFP (1) 100-1) based on the instruction information instructing upgrading of the installed external application 118 and transferring, which is performed by the installation synchronizing unit 131f, of the fault-correction instruction signal fed from the central management apparatus 500 to the slave MFP 100.

Thereafter, the installation-result notifying unit 131c determines whether the fault-correction process has been successfully performed (Step S115).

If, as a result of the determination, it is determined that the fault-correction process has been successfully performed (YES at Step S115), the installation-result notifying unit 131c transmits a fault-correction-success notification signal for notification of success in the fault-correction process to the data transmitting unit 131a-2 (Step S116). When receiving the fault-correction-success notification signal, the data transmitting unit 131a-2 transmits the fault-correction-success notification signal to the central management apparatus 500.

In contrast, if, as a result of the determination made at Step S115, it is determined that the fault-correction process has failed (NO at Step S115), the installation-result notifying unit 131c transmits a fault-correction-failure notification signal for notification of failure in the fault-correction process to the data transmitting unit 131a-2 (Step S117). When receiving the fault-correction-failure notification signal, the data transmitting unit 131a-2 transmits the fault-correction-failure notification signal to the central management apparatus 500.

After the process performed at Step S116, when receiving a reinstallation instruction signal from the central management apparatus 500 via the data receiving unit 131a-1 (Step S118), the installation unit 131b performs reinstallation of the target external application 118 (Step S119).

Thereafter, the installation-result notifying unit 131c determines whether the reinstallation has been successfully performed (Step S120).

If, as a result of the determination, it is determined that the reinstallation has been successfully performed (YES at Step S120), the installation-result notifying unit 131c transmits a reinstallation-success notification signal for notification of success in the reinstallation to the data transmitting unit 131a-2 (Step S121). When receiving the reinstallation-success notification signal, the data transmitting unit 131a-2 transmits the reinstallation-success notification signal to the central management apparatus 500. Thereafter, this process flow ends.

In contrast, if, as a result of the determination made at Step S120, it is determined that the reinstallation has failed (NO at Step S120), the installation-result notifying unit 131c transmits a reinstallation-failure notification signal for notification of failure in the reinstallation to the data transmitting unit 131a-2 (Step S122). When receiving the reinstallation-failure notification signal, the data transmitting unit 131a-2 transmits the reinstallation-failure notification signal to the central management apparatus 500.

After the process performed at Step S117, when receiving a rollback instruction signal from the central management apparatus 500 via the data receiving unit 131a-1 (Step S123), the rollback processing unit 131d performs rollback for returning the software configuration to a configuration prior to the installation of the target external application 118 (Step S124).

On completion of the rollback performed at Step S124, the rollback processing unit 131d transmits a rollback-completion notification signal for notification of completion of the rollback to the data transmitting unit 131a-2 (Step S125). When receiving the rollback-completion notification signal, the data transmitting unit 131a-2 transmits the rollback-completion notification signal to the central management apparatus 500. Thereafter, this process flow ends.

As illustrated in FIG. 15, when the MFP (hereinafter, "master MFP") 100 specified as the master returns to an installation-acceptable state by replacement of a device by a user, or when a slave MFP 100 returns to an installation-acceptable state by replacement of a device by a user and the master MFP 100 receives an inquiry signal for to-be-installed information from the slave MFP 100 (YES at Step S130), the to-be-installed-information inquiry unit 131e outputs an inquiry signal for to-be-installed information (Step S131). When receiving the inquiry signal, the data transmitting unit 131a-2 transmits the inquiry signal to the central management apparatus 500.

The application-installation control service 131 monitors receipt of a reinstallation instruction signal of the to-be-installed information or a signal notifying that there is no to-be-installed information, from the central management apparatus 500 (Step S132 and Step S133). If, through the monitoring, it is determined that a reinstallation instruction signal has been received (YES at Step S132), the installation unit 131b performs a predetermined reinstallation process of the to-be-installed information (Step S134). Thereafter, this process flow proceeds to Step S120.

In contrast, if, through the monitoring performed at Step S132 and Step S133, it is determined that a signal notifying that there is no to-be-installed information has been received (YES at Step S133), this process flow ends.

The process flows for the central management apparatus 500 in the sequence diagrams illustrated in FIG. 8 to FIG. 12 are described in detail below with reference to the flowcharts given in FIG. 16 and FIG. 17.

Figure 16:
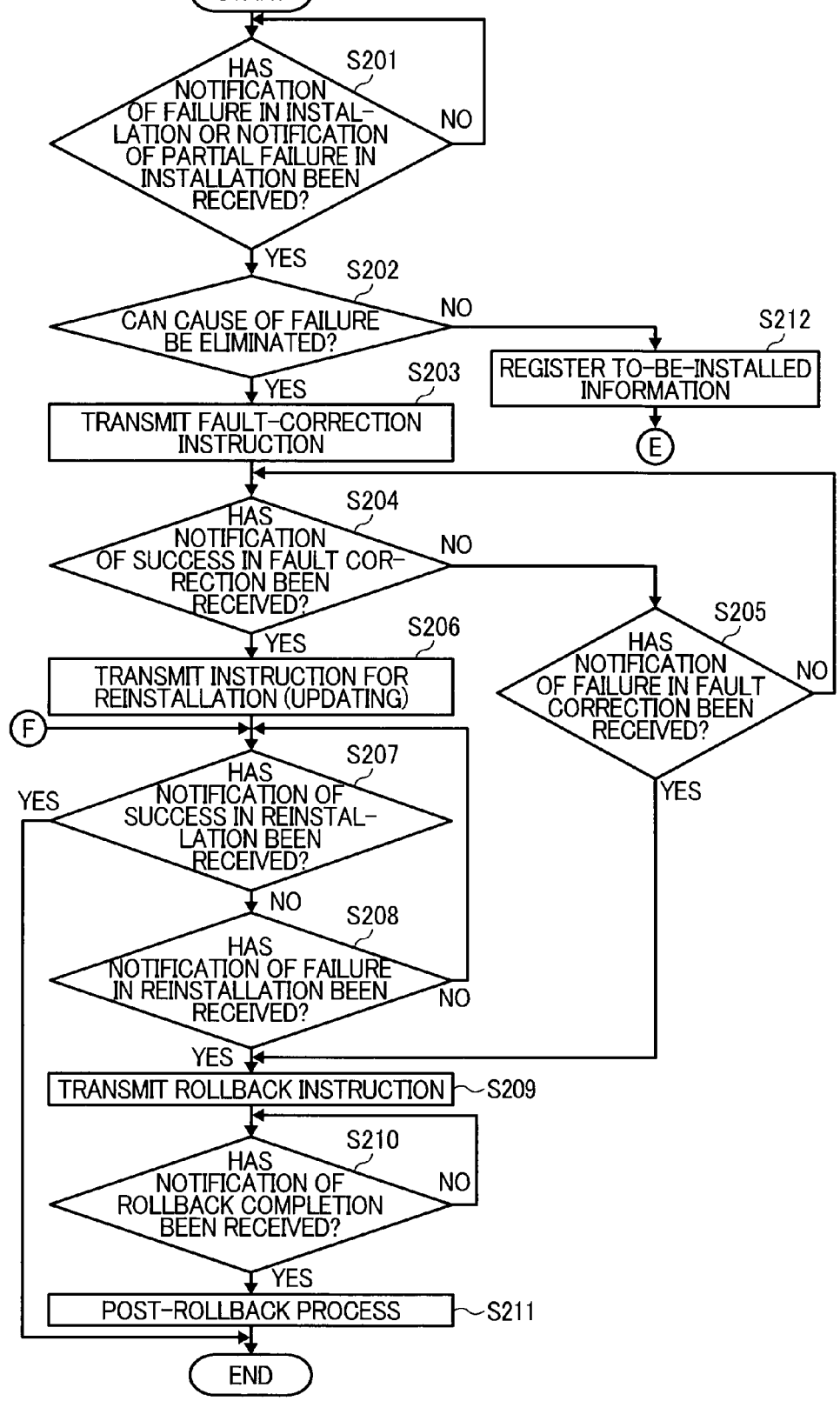
FIG. 16 is a flowchart illustrating a process flow in the central management apparatus.
Figure 17:
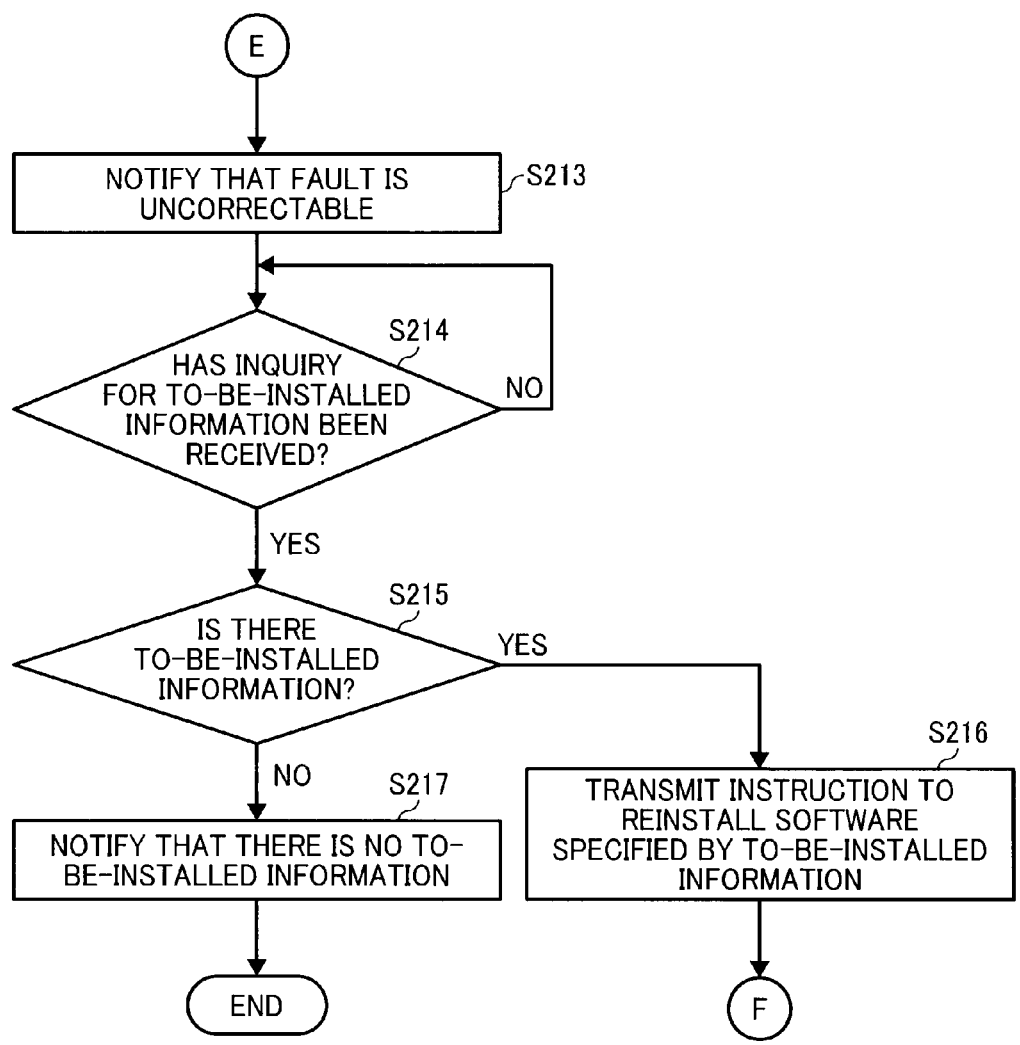
FIG. 17 is a flowchart illustrating a process flow performed in the central management apparatus.

FIG. 16 and FIG. 17 are flowcharts illustrating a procedure to be performed by the installation managing unit 510 of the central management apparatus 500.

As illustrated in FIG. 16, the installation managing unit 510 of the central management apparatus 500 according to the present embodiment monitors receipt of the installation-failure notification signal or the partial-failure notification signal from the MFP 100 (Step S201).

If, through the monitoring, it is determined that the failure-cause determining unit 512 has received an installation-failure notification signal from the MFP 100 via the data receiving unit 511a (YES at Step S201), the failure-cause determining unit 512 diagnoses a cause of the failure in installation of a target external application 118 based on the received installation-failure notification signal or the received partial-failure notification signal, and determines whether the cause of the failure can be eliminated by remote control from the central management apparatus 500 (Step S202).

If, as a result of the determination, it is determined that the cause of the failure can be eliminated by remote control (YES at Step S202), the fault-correction instruction unit 513 transmits a fault-correction instruction signal for arranging installation environment to the data transmitting unit 511b (Step S203). When receiving the fault-correction instruction signal, the data transmitting unit 511b transmits the fault-correction instruction signal to the central management apparatus 500.

Thereafter, the installation managing unit 510 monitors receipt of a signal notifying whether a fault-correction process has been successfully performed, from the MFP 100

(Step S204 and Step S205). If, through this monitoring, it is determined that a fault-correction-success notification signal notifying of success in the fault-correction process has been received via the data receiving unit 511a (YES at Step S204), the reinstallation instruction unit 514 transmits a reinstallation instruction signal instructing to perform reinstallation, to the data transmitting unit 511b (Step S206). When receiving the reinstallation instruction signal, the data transmitting unit 511b transmits the reinstallation instruction signal to the MFP 100.

Thereafter, the installation managing unit 510 monitors receipt of a signal notifying whether reinstallation has been successfully performed, from the MFP 100 (Step S207 and Step S208). If, through this monitoring, it is determined that a reinstallation-success notification signal has been received via the data receiving unit 511a (YES at Step S207), this process flow ends.

In contrast, if, through the monitoring performed at Step S204 and Step S205, it is determined that a fault-correction-failure notification signal notifying of failure in the fault-correction process has been received via the data receiving unit 511a (YES at Step S205), the rollback instruction unit 515 transmits a rollback instruction signal instructing to perform rollback, to the data transmitting unit 511b (Step S209). When receiving the rollback instruction signal, the data transmitting unit 511b transmits the rollback instruction signal to the MFP 100.

Subsequently, the installation managing unit 510 monitors receipt of a rollback-completion notification signal from the MFP 100 (Step S210). If, through this monitoring, it is determined that a rollback-completion notification signal has been received via the data receiving unit 511a (YES at Step S210), the installation managing unit 510 performs a post-rollback process (Step S211) to complete this process flow. The process at Step S211 can be omitted.

If, through the monitoring performed at Step S207 and Step S208, it is determined that the installation managing unit 510 has received a reinstallation-failure notification signal from the MFP 100 via the data receiving unit 511a (YES at Step S208), this process flow proceeds to Step S209 mentioned above.

If, as a result of the determination made at Step S202 mentioned above, it is determined that the cause of the failure cannot be eliminated by remote control (NO at Step S202), the to-be-installed-information registering unit 517 registers destination information (IP address) of the MFP 100 and information about the target external application 118 in the to-be-installed information registration table T1 (Step S212).

Subsequently, the fault-correction instruction unit 513 of the installation managing unit 510 transmits a fault-correction instruction signal for arranging installation environment, to the MFP 100 (Step S213).

Thereafter, the installation managing unit 510 monitors receipt of an inquiry signal for to-be-installed information from the MFP 100 (Step S214). If, through this monitoring, it is determined that the inquiry signal has been received via the data receiving unit 511a, the to-be-installed-information checking unit 518 searches the to-be-installed information registration table T1 to determine whether there is to-be-installed information related to the corresponding MFP 100, or, put another way, whether there is a target external application 118 to be installed on the MFP 100 (Step S215).

When, as a result of this search, it is determined that there is no to-be-installed information, or, put another way, there is not a target external application 118 to be installed on the MFP 100 (NO at Step S215), the to-be-installed-information checking unit 518 transmits a no-information notification signal to the data transmitting unit 511b to notify that there is no to-be-installed information (Step S217). When receiving the no-information notification signal, the data transmitting unit 511b transmits the no-information notification signal to the MFP 100. Thereafter, this process flow ends.

In contrast if, as a result of this search performed at Step S215, it is determined that there is to-be-installed information, or, put another way, there is a target external application 118 to be installed on the MFP 100 (YES at Step S215), the to-be-installed-information checking unit 518 transmits a reinstallation instruction signal of the to-be-installed-information to the data transmitting unit 511b to notify that there is the to-be-installed information and to notify of information about the target external application 118 that is not installed yet (Step S216). When receiving the reinstallation instruction signal, the data transmitting unit 511b transmits the reinstallation instruction signal to the MFP 100. Thereafter, this process flow proceeds to Step S207 discussed above.

According to the embodiment discussed above, even when installation of a target external application 118 on the MFP 100 has failed because of a physical failure, such as device breakdown, that is uncorrectable by remote control from the central management apparatus 500, it is allowed to successfully install the target external application 118 in a reinstallation process to be performed after the failure.

Exemplary embodiments of the present invention have been discussed above; however, the present invention is not limited to the embodiments discussed above, and variations and modifications can be made within the scope of the present invention as set forth in the appended claims.

In the embodiment, the processes for avoiding failure in installation of an external application (software) 118 to be purchased have been discussed. Alternatively, for instance, the processes can be configured for avoidance of failure in updating of an installed external application 118 that has already been installed on the MFP 100 to a latest external application 118, for avoidance of failure in updating of the installed external application 118 for recovery from a defective condition, or for avoidance of failure in installation of the installed external application 118 for upgrading to higher version.

In the embodiment discussed above, it is assumed that target software to be subjected to the processes is the external application 118. Alternatively, the target software can be other software, such as the printer application 111, the copier application 112, the facsimile application 113, the scanner application 114, the network file application 115, the process inspecting application 116, or the web application 117.

In the embodiment, it is assumed that the image forming apparatus to be maintained and managed by the central management apparatus 500 is an MFP that has at least two functions of, for instance, a printer function, a copier function, a facsimile function, and a scanner function and allows an external application 118 downloaded from the application management server 400 to be installed thereon. Alternatively, the image forming apparatus can be, for instance, a printer, a copier, a facsimile, a scanner, or the like apparatus that allows an external application 118 downloaded from the application management server 400 to be installed thereon.

Each of various program instructions to be executed by the MFP (image forming apparatus) 100, the intermediary apparatus (apparatus management apparatus) 200, and the central management apparatus 500 according to the embodiment can be configured to be provided as being recorded in a computer-readable recording medium, such as a compact disc-read-only memory (CD-ROM), a flexible disk (FD), a compact disc recordable (CD-R), a digital versatile disk (DVD), or a USB memory, in an installable or executable format. The program instructions can be configured to be provided or distributed via a network, such as the Internet.

In the embodiment discussed above, it is assumed that the apparatus that includes the application-installation control service 131 is the MFP 100, which is an image forming apparatus; however, the apparatus is not limited thereto. Alternatively, the apparatus can be, for instance, an information processing apparatus, such as a typical PC. In such a case, target software can be software downloaded from an external device via a network, such as the Internet, and installed or software installed via a recording medium, such as a CD-ROM.

The apparatus configurations, functional configurations, table configurations, and the like discussed in the embodiments are to be considered in all respects only as illustrative and not restrictive.

According to an aspect of the present invention, it is advantageously allowed to avoid failure in installation due to physical trouble that cannot be solved by remote control.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
   an information processing apparatus that allows software to be installed thereon; and
   a management apparatus that manages installation of the software on the information processing apparatus, the management apparatus being connected to the information processing apparatus via a network, wherein
   the information processing apparatus includes:
     an installation unit that installs software when a request for installation of the software has been made;
     a success-and-failure notifying unit that notifies the management apparatus whether the software has been successfully installed by the installation unit; and
     an inquiry unit that transmits an inquiry to the management apparatus as to whether there is to-be-installed software which has not been installed on the information processing apparatus, when the information processing apparatus returns to an installation-acceptable state in which the information processing apparatus accepts software installation, and
   the management apparatus includes:
     a determining unit that, when receiving a failure notification that installation of the software fails from the success-and-failure notifying unit, determines a cause of failure based on the failure notification;
     a storing processing unit that, when the determining unit determines that the cause of the failure cannot be solved by remote control, stores registration information in which identifying information of the information processing apparatus and information indicating to-be-installed software which has not been installed on the information processing apparatus are associated with each other, in a storage unit; and
     a reinstallation instruction unit that, when receiving the inquiry from the inquiry unit, searches the registration information stored in the storage unit, and instructs the information processing apparatus to install the to-be-installed software thereon.

2. The information processing system of claim 1, comprising a master information processing apparatus specified as a master and a slave information processing apparatus specified as a slave, each of which serves as the information processing apparatus, wherein
   when the slave information processing apparatus returns to the installation-acceptable state, the master information processing apparatus instructs the slave information processing apparatus to reinstall the to-be-installed software.

3. A management apparatus that manages installation of software on an information processing apparatus, to which the management apparatus is connected via a network, the management apparatus comprising:
   a determining unit that, when receiving a failure notification that installation of the software fails from the information processing apparatus, determines a cause of failure based on the failure notification;
   a storing processing unit that, when the determining unit determines that the cause of the failure cannot be solved by remote control, stores registration information in which identifying information of the information processing apparatus and information indicating to-be-installed software which has not been installed on the information processing apparatus are associated with each other, in a storage unit; and
   a reinstallation instruction unit that, when receiving an inquiry as to whether there is the to-be-installed software from the information processing apparatus, searches the registration information stored in the storage unit, and instructs the information processing apparatus to install the to-be-installed software thereon if there is the to-be-installed software.

4. An information processing apparatus that allows software to be installed thereon, the information processing apparatus comprising:
   an installation unit that installs software when a request for installation of the software has been made;
   a success-and-failure notifying unit that notifies a management apparatus whether the software has been successfully installed by the installation unit; and
   an inquiry unit that transmits the inquiry to the management apparatus as to whether there is the to-be-installed software which has not been installed on the information processing apparatus, when the information processing apparatus returns to an installation-acceptable state in which the information processing apparatus accepts software installation.

5. The information processing apparatus of claim 4, wherein
   the information processing apparatus is a master information processing apparatus specified as a master,
   when a slave information processing apparatus specified as a slave returns to the installation-acceptable state, the master information processing apparatus instructs the slave information processing apparatus to reinstall the to-be-installed software.

6. A computer program product comprising a non-transitory computer-usable medium having computer-readable program codes embodied in the medium for processing information in a management apparatus that includes a determining unit, a storing processing unit, and a reinstallation instruction unit, and that manages installation of software on an information processing apparatus, to which the management apparatus is connected via a network, the program codes when executed causing a computer to execute:
   determining, when receiving a failure notification that installation of the software fails from the information processing apparatus, a cause of failure based on the failure notification, by the determining unit;

storing, when it is determined that the cause of the failure cannot be solved by remote control at the determining, registration information in which identifying information of the information processing apparatus and information indicating to-be-installed software which has not been installed on the information processing apparatus are associated with each other, in a storage unit by the storing processing unit; and searching, when receiving an inquiry as to whether there is the to-be-installed software from the information processing apparatus, the registration information stored in the storage unit, and instructing the information processing apparatus to install the to-be-installed software thereon, by the reinstallation instruction unit, if there is the to-be-installed software.

7. A computer program product comprising a non-transitory computer-usable medium having computer-readable program codes embodied in the medium for processing information in an information processing apparatus that allows software to be installed thereon and includes an installation unit, a success-and-failure notifying unit, and an inquiry unit, the program codes when executed causing a computer to execute:

installing software by the installation unit when a request for installation of the software has been made;

notifying, by the success-and-failure notifying unit, a management apparatus of whether the software has been successfully installed at the installing; and transmitting the inquiry to the management apparatus by the inquiry unit as to whether there is the to-be-installed software which has not been installed on the information processing apparatus, when the information processing apparatus returns to an installation-acceptable state in which the information processing apparatus accepts software installation.

* * * * *